United States Patent [19]
Bigley, Jr. et al.

[11] Patent Number: 5,406,641
[45] Date of Patent: Apr. 11, 1995

[54] FLEXIBLE LIGHT PIPE, CURED COMPOSITE AND PROCESSES FOR PREPARATION THEREOF

[75] Inventors: Andrew B. W. Bigley, Jr., Croydon, Pa.; Jeffrey L. Daecher, Sicklerville, N.J.; Norman L. Holy, Penns Park, Pa.; Robert E. Jerman, Chalfont, Pa.; Phelps B. Johnson, Holland, Pa.; William J. Work, Huntington Valley, Pa.

[73] Assignee: Rohm and Haas Company, Philadelphia, Pa.

[21] Appl. No.: 76,039

[22] Filed: Jun. 15, 1993

[51] Int. Cl.$^6$ ............................................. G02B 1/04
[52] U.S. Cl. ........................ 385/141; 156/244.12; 264/1.6; 264/171; 362/32; 385/123
[58] Field of Search ................... 264/171, 1.5, 1.6; 156/244.12; 385/123, 125, 141, 143; 362/32, 34

[56] References Cited
U.S. PATENT DOCUMENTS

| | | |
|---|---|---|
| 3,453,230 | 11/1987 | Plueddemann . |
| 3,641,332 | 7/1969 | Reick et al. . |
| 4,133,664 | 1/1979 | Aulich et al. . |
| 4,161,500 | 7/1979 | Schleinitz et al. ............... 264/1.5 |
| 4,380,367 | 4/1983 | Suzuki . |
| 4,381,269 | 4/1983 | Kaino et al. ...................... 264/1.5 |
| 4,422,719 | 12/1983 | Orcutt . |
| 4,431,264 | 2/1984 | Clarke . |
| 4,466,697 | 8/1984 | Daniel . |
| 4,505,543 | 3/1985 | Ueba et al. . |
| 4,543,403 | 9/1985 | Isayama et al. . |
| 4,576,438 | 3/1986 | Tatsukami et al. . |
| 4,681,400 | 7/1987 | Ueba et al. ...................... 264/1.6 |
| 4,708,833 | 11/1987 | Ohsawa et al. . |
| 4,763,984 | 8/1988 | Awai et al. . |
| 4,828,359 | 5/1989 | Ueba et al. ...................... 264/1.5 |
| 4,919,513 | 2/1972 | Nakakuki et al. . |
| 4,957,347 | 9/1990 | Zarian . |
| 5,052,778 | 10/1991 | Jamshid . |
| 5,067,831 | 11/1991 | Robbins et al. . |
| 5,111,526 | 5/1992 | Yamamoto et al. ............... 264/1.6 |
| 5,122,580 | 6/1992 | Zarian et al. . |
| 5,146,535 | 9/1992 | Anzai et al. . |
| 5,149,467 | 9/1992 | Zarian . |
| 5,221,387 | 6/1993 | Robbins et al. ............... 156/244.12 |
| 5,225,166 | 7/1993 | Zarian et al. . |

FOREIGN PATENT DOCUMENTS

| | | |
|---|---|---|
| 0228495 | 7/1987 | European Pat. Off. ............ 264/1.5 |
| 381461 | 8/1990 | European Pat. Off. . |
| 469673 | 2/1992 | European Pat. Off. . |
| 53-60242 | 5/1978 | Japan ............................... 264/1.5 |
| 58-16163 | 3/1983 | Japan ............................... 264/1.5 |
| 61-18450 | 1/1986 | Japan . |
| 61-34504 | 2/1986 | Japan . |
| 63-274903 | 11/1988 | Japan ............................... 264/1.5 |
| 1-219802 | 9/1989 | Japan ............................... 264/1.5 |
| 3-107904 | 5/1991 | Japan . |
| 3-180804 | 8/1991 | Japan . |
| 3-241302 | 10/1991 | Japan . |
| 4350812 | 10/1991 | Japan . |
| 3-259202 | 11/1991 | Japan . |
| 1037498 | 7/1966 | United Kingdom . |
| 1143689 | 2/1969 | United Kingdom . |
| 2234086 | 1/1991 | United Kingdom . |

*Primary Examiner*—Jeffery Thurlow
*Attorney, Agent, or Firm*—Darryl P. Frickey; Richard A. Haggard

[57] ABSTRACT

Process for cured composites and flexible light pipe, in which a molten cladding polymer and a crosslinkable core mixture are coaxially extruded through a coextrusion die, the cladding is filled with the crosslinkable core mixture, and the crosslinkable core mixture is cured within the cladding.

24 Claims, 1 Drawing Sheet

FLEXIBLE LIGHT PIPE, CURED COMPOSITE AND PROCESSES FOR PREPARATION THEREOF

BACKGROUND OF INVENTION

This invention relates to processes, continuous processes, cured composites and related compositions. One embodiment of the invention particularly relates to a process, preferably a continuous process for producing a light pipe with flexibility or a flexible light pipe ("FLP"), and the improved FLP product which the process produces. The invention also relates to efficiently fabricating a FLP having a core diameter of at least 3 millimeters, useful for conveying visible light and which remains flexible and transparent under a wide range of use conditions.

The production of a cured composite is known from European Patent Application 469 673, in which a continuous object of thermoset polymer is made by continuous polymerization, utilizing ultraviolet radiation to polymerize monomer in a clad. This production method teaches the use of ultraviolet (UV) radiation to obtain polymerization within a few seconds. Problems with this method include: 1) reduction of light transmittance and increased yellowness in thermoset polymers due to use of UV initiators, 2) requirement of fast polymerization such as within a few seconds by UV radiation, to avoid shrinkage of the thermoset polymer within the clad after the clad has solidified, and 3) the teaching away from thermal cure by heat. Further, this reference does not teach a light pipe having flexibility and optical properties such as low light transmission loss.

The range of applications to which a visible light-conveying light pipe can be applied are dictated by the physical and optical characteristics the FLP develops during the fabrication process. For example, in U.S. Pat. No. 4,708,833 a method teaches rapidly crosslinking ("curing") a falling strand of polymer syrup by ultraviolet light, electron beam, or heat, thus curing the polymer syrup (elastomeric core) and achieving structural integrity, and then simultaneously or subsequently applying a cladding. Production methods using such rapid curing of the core suffer from several disadvantages: 1) limited breadth of available curing chemistry, 2) increased production rates require a proportional increase in cure rate or distance to a take-up roller, and 3) reduced light transmittance of the light pipe, particularly in the blue portion of the visible spectrum (i.e. increased yellowness) from use of curing materials that degrade or yellow upon heating or irradiation.

U.S. Pat. No. 4,957,347 ("347") teaches a flexible, clad monofilament production method which fills a pre-formed cladding tube with monomer, and then cures the monomer within the filled cladding. Such monomer-fill processes have advantages in providing a range of composition, curing chemistries and filling rates which can be employed, but suffer from four major limitations: 1) heat-transfer problems during polymerization and curing, 2) volumetric shrinkage upon polymerization, 3) thin claddings which require reinforcement (for example, a thin clad of poly(tetrafluoroethylene)) with another tube layer (e.g. a "sheathing" layer), and 4) relatively low production rates. Problems such as poor heat-transfer rates, low boiling point of many useful monomers, and the need for practical production rates, led to the use of large, complex, pressurized polymerization equipment, as a partial solution to some of the four above identified problems. Problems such as volumetric shrinkage in monomer-fill processes led to the use of short monomer-filled cladding sections processed in U-shaped tubes or by slow feeding of monomer-filled cladding through a heated bath ("bulk polymerization methods"), as a partial solution to the above identified problems. However, these slow laborious bulk production methods led to the use of high initiator levels to speed up production rates. These high initiator levels contribute to light absorption losses when heating such products in air. Further, bulk polymerization methods suffer from polymer compositional drift during copolymerization which can lead to phase separation and concomitant haze, thereby reducing light transmission efficiency. Bulk polymerization, as practiced in '347, constrains the range of useful comonomer combinations. Neither the use of pressurized polymerization equipment nor carefully designed copolymerization temperature profiles (methods which individually solve some deficiencies) collectively overcome all the four above identified problems in these methods.

Based on, but not limited to, the above identified problems in the art, a continuous and efficient process has not been developed prior to this invention, to manufacture a light pipe having features including ambient temperature flexibility, good transmittance, low yellowness, softness, and property retention under thermal aging conditions. It is contemplated that the diameter of light pipes of the invention shall exceed 1 millimeter (mm) and shall typically range from 3 to 20 mm. It would be a significant advancement of the art to have a method for producing a light pipe and a light pipe product which achieves these features. It would be particularly advantageous to be able to cure a core under thermally controlled conditions, thereby avoiding the constraints of "rapid curing" by UV radiation in a continuous process. It would be generally advantageous to decouple the light pipe production step from structural integrity and cure rate requirements of the light pipe core. It also would be advantageous to decouple a sheathing step, if desired from the process while using thin-walled cladding materials. It would also be advantageous to have a process generally applicable to producing cured composites from a variety of compositions having a variety of end uses.

SUMMARY OF THE INVENTION

Figure 1:
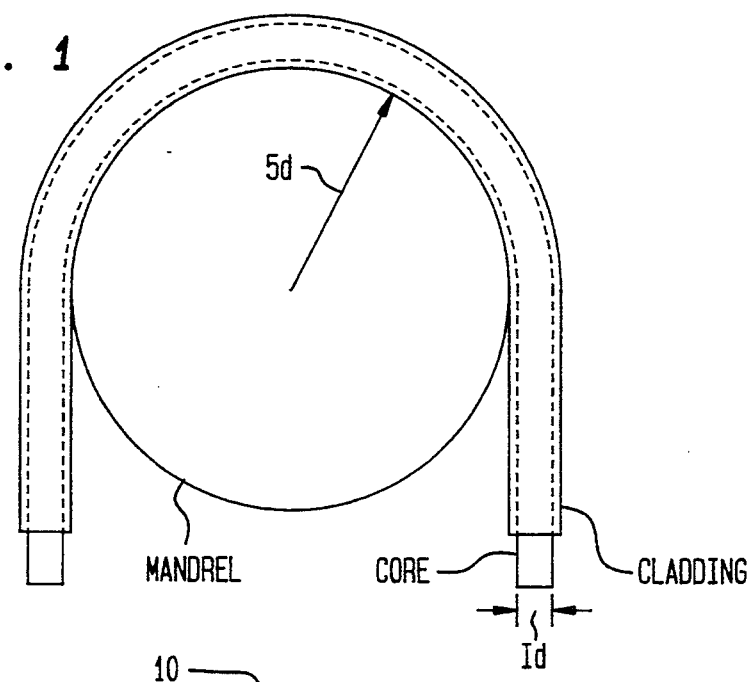
FIG. 1 is of a 180 degree bend of a FLP for determining flexibility.

The present invention improves upon the current problems in the art of producing an efficient light-transmitting, light pipe having flexibility. In its broadest scope, a unique process is contemplated for a broadly applicable process for producing a cured composite comprising the steps of:

a) concurrently and coaxially extruding:
   i.) a molten cladding polymer through an annular channel of a coextrusion die to form an extruded tubular cladding, and
   ii.) a crosslinkable core mixture through a core mixture delivery tube of the coextrusion die to form an extruded crosslinkable core mixture within the circumference of the extruded tubular cladding;

b) filling the extruded tubular cladding with the extruded crosslinkable core mixture; and c) curing the crosslinkable core mixture within the tubular cladding. The steps (a), b) and c)) of this method may be continuous.

A particularly useful process for producing a light pipe comprises the steps of:

a) concurrently and coaxially extruding:
   i.) a molten fluoropolymer through an annular channel of a coextrusion die to form an extruded tubular fluoropolymer cladding, and
   ii.) a crosslinkable core mixture through a core mixture delivery tube of the coextrusion die to form an extruded crosslinkable core mixture within the circumference of the extruded tubular fluoropolymer cladding;

b) filling the extruded tubular fluoropolymer cladding with the extruded crosslinkable copolymer mixture; and c) curing the crosslinkable core mixture within the tubular fluoropolymer cladding wherein the cured extruded crosslinkable core mixture and the extruded fluoropolymer cladding are in substantially complete contact. The steps (a), b) and c)) of this method may be continuous.

A light pipe having flexibility as described herein may be called a flexible light pipe ("FLP").

One light pipe having the characteristics described immediately above is envisioned wherein the crosslinkable core mixture comprises:

a) from about 90 to about 99.9 weight percent, based on the crosslinkable core mixture weight, of an uncrosslinked copolymer having weight average molecular weight from about 2,000 to about 250,000 daltons, the uncrosslinked copolymer comprising:
   i) from about 80 to about 99.9 weight percent, based on the uncrosslinked copolymer weight, of a bulk monomer unit selected from a $C_1$–$C_{18}$ alkyl acrylate, a $C_1$–$C_{18}$ alkyl methacrylate, or mixtures thereof,
   ii) from about 0.1 to about 20 weight percent, based on the uncrosslinked copolymer weight, of a functionally reactive monomer; and
   iii) from 0 to about 10 weight percent, based on the uncrosslinked copolymer weight, of a refractive index increasing monomer selected from styrene, benzyl acrylate, benzyl methacrylate, phenylethyl acrylate or phenylethyl methacrylate; and b) from about 0.1 to about 10 weight percent, based on the crosslinkable core mixture weight, of a reactive additive.

In its broadest application, the process of the invention may be used in making composites such as data transmission cables; light pipes; FLPs useful, for example, for heat-formable side lighting applications (e.g. so-called "neo-neon" light pipe applications), connectors for coaxial conduits and light pipes; ionically conductive flexible cores for electronic displays; and flexible thermochromic devices. Light pipes and FLPs afforded by the process having useful efficiencies in transmitting visible light may be used, for example, in automotive and transportation (e.g. head and tail lights), commercial lighting (e.g. in architectural lighting and signs), and in residential lighting. Other uses and advantages provided by the processes, continuous processes, composites and compositions of the invention will become apparent in the detailed description of the invention.

DETAILED DESCRIPTION OF THE INVENTION

The invention encompasses a method of producing a cured composite wherein the core is cured, preferably thermally, in a step which is subsequent to (decoupled from) the core and cladding extrusion and filling steps. Following the synthesizing and conveying of a crosslinkable core mixture and a molten cladding polymer to a coextrusion die in an extruder, the processing steps comprise extruding each of these such that the extruded core mixture fills the extruded tubular cladding, and subsequently, the extruded core mixture is cured in this extruded tubular cladding. The process is particularly well suited to preparing a light pipe or flexible light pipe in a continuous and efficient manner to provide a light pipe or FLP having superior optical transmission properties. The light pipes and FLPs of the invention have useful optical properties and a visible light transmission loss of less than about 2 decibels ("dB") per meter (i.e. 2000 dB per kilometer), preferably less than about 1.0 dB/m (ca. 93% transmittance per foot), more preferably less than about 0.70 dB/m and most preferably less than or about 0.65 dB/m. The invention is herein described in detail below.

The crosslinkable core mixture can be prepared from a wide range of monomers. Generally, for the process of the invention, the glass transition temperature ("Tg"), of the crosslinkable core mixture need only be low enough to permit a processing temperature below that of the cladding. The resulting cured composite need not be flexible at room temperature, that is, it may be stiff and non-yielding to bending stress at around ambient temperatures. Crosslinkable core mixtures having copolymers Tgs as high as about 130 degrees Celsius (°C.) are envisioned, although higher Tgs are not excluded. Additionally, poly(glutarimides) having a Tg of about 130° to 150° C. may be used as a component of crosslinkable core mixture. However, to obtain a cured composite which is a FLP having core diameter >3 mm and having flexibility at or below ambient temperatures the copolymer core should have a Tg equal to or less than about 40° C., preferably less than about 10° C.

From FIG. 1, "Flexibility" of a light pipe or FLP is defined at a given use temperature. For the FLP of the invention, flexibility at room temperature (about 20° C.) means the ability of the FLP to withstand a 180 degree bend without cured core mixture fracture at a bend radius equal to or less than five times ("5d") the core mixture diameter ("1d") of the FLP. Such a fracture results in light transmission loss, rendering the FLP ineffective. The radius can be determined, for example, by a mandrel.

This level of FLP flexibility at ambient temperatures is essential to any application in which the FLP must be installed in a complex part or area, as is frequently encountered in buildings, automobiles and display devices. FLP flexibility at low temperatures (such as around −20° C.) is important if the FLP is to be a flexing component of a moveable assembly which is employed in outdoor applications, such as in a door, automobile door or an automobile trunk. FLPs used in automotive and many other applications must endure prolonged exposure to elevated temperatures and must retain their properties, particularly flexibility, at low temperatures. The 1992 Society of Automotive Engineers (SAE) Ground Lighting Vehicle Standards provide temperature requirements for various components of lighting systems, such as sources, switches, plastic components, and cabling. No SAE specification for light pipe or flexible light pipes exists. Among the various existing SAE specifications, lower temperature limits usually are $-17°$ to $-51°$ C., and typically $-32°$ C. or $-40°$ C. Typical upper temperature requirements are 49° to 74° C. For low tension primary cable, SA-EJ1128JUN88 requires the ability to bend $\geq 180$ degrees around a 76 or 152 mm diameter mandrel at $-40°$ C. and $-51°$ C. All FLPs of this invention are intended to be flexible at 20° C. Some are flexible within the range of from 20° C. to $-51°$ C. "Softness" of the FLP core (cured crosslinkable core mixture) is also a desirable property because it is related to breakage and fabrication techniques. Softness is defined herein by a "level of compressibility" discernible by a modified Shore "A" test described below. A degree of softness, typically a Shore "A" value $<90$, is desired to enable cutting of a FLP by a hand held instrument, such as a scissors or knife, in the field (i.e. not requiring motorized instruments or factory equipment) and to facilitate the flush fit against other light conduit such as a glass pipe, connector, light pipe or an FLP. Requirements for flexibility and softness vary with end use requirements and are measured, for example, by flexural modulus, minimum bend radius determinations and Shore "A" hardness, as described herein. Flexibility is largely determined by the Tg of the core copolymer.

Monomer or comonomers, termed "bulk" monomers, can make up at least 60 weight percent, preferably at least 80 weight percent, of the crosslinkable core mixture of a cured composite, light pipe or FLP. Bulk monomer is the major component of the uncrosslinked copolymer and crosslinkable core mixture and is not usually functional towards further curing or crosslinking. Examples of bulk monomers from which the uncrosslinked copolymer and crosslinkable core mixture broadly may be derived include acrylic and methacrylic (herein abbreviated "(meth)acrylic") esters, styrenic monomers such as styrene, p-bromo styrene, and alpha-methyl styrene; vinyl acetate, vinyl halides, and the like, and copolymers of these with one or the other "bulk" monomers as described. For cure chemistry in which the base polymer is a condensation polymer, the monomers comprise components such as diols and diacids, preferably aliphatic and dicarboxylic acids. Due to the high transparency conferred on their resulting polymers or copolymers, "bulk" monomers for a light pipe or FLP uncrosslinked copolymer (of the crosslinkable core mixture) are selected from among alkyl (meth)acrylic esters. For these, "alkyl" is defined as alkyl, cycloalkyl, alkyloxyalkyl, arylalkyl, alkylaryl, and the like having from, in total, 1 to 18 carbon atoms. "Alkyl" here includes, for example, methyl, ethyl, propyl, isopropyl, normal butyl, sec-butyl, isobutyl, tertiary butyl, hexyl, n-decyl, isodecyl, dodecyl, cyclohexyl, 3,3,5-trimethylcyclohexyl, 2-methoxyethyl, 2-ethoxyethyl, tetrahydrofurfuryl, and the like, and isomers and mixtures of these. Aromatic group-containing, refractive index increasing monomers such as styrene, benzyl (meth)acrylate, phenylethyl (meth)acrylate, and the like may be added to the bulk monomers to raise refractive index of the uncrosslinked copolymer, but, if used at all, they are used at levels under about 10 wt. % of the copolymer weight. The following alkyl (meth)acrylic esters which are exemplified as FLP bulk monomers are preferred due to their cost, availability in high purity, and light-transmitting capabilities: methyl acrylate, ethyl acrylate, butyl acrylate, methyl methacrylate, ethyl methacrylate and butyl methacrylate.

One or more functionally reactive monomers are incorporated into the uncrosslinked copolymer of the crosslinkable core mixture and are selected for their copolymerizability with the bulk monomer(s) and for their utility in the subsequent crosslinkable core mixture curing reaction. As "curable" monomers, the functionally reactive monomers are mono-unsaturated compounds with an additional "reactive" component. Examples of functionally reactive comonomers useful in the invention include, but are not limited to, hydroxyethyl (meth)acrylate, 2-hydroxypropyl (meth)acrylate; glycidyl (meth)acrylate; alkoxysilane monomers such as 2-methacryloxyethyltrimethoxysilane, 3-methacryloxypropyltrimethoxysilane ("MATS"), and 3-acryloxypropyltrimethoxysilane. Useful weight ratios of the sum of bulk monomer(s) to the functionally reactive monomer(s) in the uncrosslinked copolymer of the crosslinkable core mixture are from about 80/20 to 99.9/0.1; when the functionally reactive monomer is a silane, preferable use ratios are from about 90/10 to about 98/2, and most preferably 94/6 to 98/2. Other useful functionally reactive monomers and their cure are discussed herein.

The uncrosslinked copolymer of the crosslinkable core mixture may be prepared using free radical initiators known in the art and which may be chosen to provide low initial color and resistance to discoloration upon aging. For example, organic peroxides may be used, and among these, di-tert-butyl peroxide is preferred due to its availability in high purity, facile distillation and absence of aromatic or nitrogen-containing impurities or groups. Azo-type initiators, such as azo-tert-butane, azo-tert-octane, 2,2'-azobis(2-methyl-propanenitrile), 2,2'-azobis(2-methylbutanenitrile), 2,2'-azobis(cyclohexanecarbonitrile), and the like generally are preferred over the organic peroxides for use in thermally initiating (meth)acrylic compositions, particularly those rich in acrylic monomer(s). For initial color and aged color in a FLP, it is generally preferred to use as little initiator as possible. Initiator levels at or below 0.1 wt. % of the copolymer weight may be used effectively, and monomer to copolymer conversions are taken to at least 50%, more typically to at least 85%, often to at least 90%; residual monomer(s) may be further reduced by devolatilization prior to extrusion.

An advantage of using a preformed uncrosslinked copolymer for the process of the invention is that polymerization shrinkage (i.e. that loss of volume resulting from the increase of density of tile polymer compared to the density of the monomer) already has occurred prior to filling tile cladding, thus minimizing the problems of air gaps and shrinkage which occur when monomer or low molecular weight polymers, for example "oligomers" and the like, are used. Weight average molecular weight (Mw) of the crosslinkable core mixture may range from about 2,000 to about 250,000 daltons; for a light pipe having an acrylic-based core copolymer, Mw's of from about 10,000 to about 150,000 daltons are preferred. Chain-transfer agents may be used in their known role of aiding molecular weight control in preparing the uncrosslinked copolymer. Choice of chain-transfer agent is not critical within the broadest cured composites of the invention; for FLPs, however agents giving acceptable color are used. Examples of chain transfer agents which may be used for cured composites, light pipes and FLPs are mercaptans, such as ethyl mercaptan, butyl mercaptan, t-butyl mercaptan, dodecyl mercaptan, and the like. Mercaptans containing one or more functional groups capable of participating in the subsequent cure of the uncrosslinked copolymer also may be used; examples of these include, 2-mercaptoethanol, 3- or 4-mercaptobutanol, 3-mercapto-1,2-propanediol, 2-mercaptopropionic acid, 3-mercaptopropionic acid, and the like, or mixtures of these. Other known chain-transfer agents, such as an alkyl bromide, also may be used. The choice of chain-transfer agent level, type, and functionality used in preparing the uncrosslinked copolymer can vary widely and is determined by balancing the ease of copolymer processing (e.g. molecular weight, flow, stability) and other properties such as cost, ease of handling, polymer performance (e.g. mechanical and optical) and cure rate, all features readily determined by one skilled in the art.

To produce a cured composite or a light pipe of the invention, it is desirable to repress premature curing of the crosslinkable core mixture by keeping a key reactant or catalyst out of a process stream until as late as practical prior to the extrusion step. One or more reactive additive is added to, and intimately mixed with, the uncrosslinked copolymer immediately prior to extruding the crosslinkable core mixture. Many types of reactive additives may be used in promoting or causing subsequent crosslinking of the uncrosslinked copolymer; the choice of reactive additive depends on the functionality incorporated within the crosslinkable core mixture. Several examples herein will illustrate the type and breadth of crosslinking contemplated. For cures utilizing hydroxy functionality (as incorporated in the uncrosslinked copolymer, for example, via copolymerization of hydroxyethyl methacrylate with the one or more bulk monomers comprising the uncrosslinked copolymer), a wide range of reactive additives may be chosen from the art, including diglycidyl ether, polyepoxides in general, di or higher lactones, such as 2,2-bis (epsilon-caprolactone-4-yl)propane ("BCP") or other bis epsilon-caprolactones; di- or poly-isocyanates, such as toluene diisocyanate, or triphenylmethane triisocyanate, or preferably, aliphatic diisocyanates such as isophorone diisocyanate or hexamethylene diisocyanate; bis-, tris-, or poly- carboxylic acids, and the like. Other useful reactive additives contemplated (depending on the uncrosslinked copolymer functionality) would include anhydrides (hydroxy, epoxy, or amino reactive), polyhydridic alcohols (acid, isocyanate, anhydride reactive), di-, tri, or higher amines (which are reactive with copolymerized isocyanate and may be used in non-color sensitive applications such as data transmission cable and taillights), and the like. Additionally, polymers bearing these functionalities may be used to cure the crosslinkable core mixture. As described above, light pipe can be produced wherein the uncrosslinked copolymer molecular weight is from about 10,000 to about 150,000 daltons; the functionally reactive monomer is selected from hydroxyethyl (meth)acrylate, 2-hydroxypropyl (meth)acrylate, or mixtures of these; and the reactive additive is selected from a diglycidyl ether, a dilactone, an aliphatic diisocyanate, a polycarboxylic acid, or an anhydride. A light pipe can be produced having the same Mw as immediately above and having glycidyl (meth)acrylate as the functional monomer and having an anhydride, a polycarboxylic acid, a diol or polyol as the reactive additive.

For crosslinking alkoxysilane-functional copolymers, reactive additives such as water, polyfunctional silanols, diacetoxysilanes, triacetoxysilanes, alkyl trialkoxysilanes, dialkoxysilanes and other compounds known to react with and crosslink silanes may be used. Catalysts for the diverse types of curing reactions described herein are considered to be "reactive additives." It is known, for example, that catalysts for silane condensation reactions include carboxylic acids, carboxylic acid-containing polymers, the aforementioned acetoxysilanes (which can generate acetic acid), and a variety of Lewis acid organometallic compounds, such as dibutyltin diacetate, dibutyltin dilaurate or zirconium octoate, carboxylic acid salts of other metals such as lead, zinc, antimony, cadmium, barium, calcium and manganese. However, some "catalysts" may not be advantageous for a light pipe of good transmitting efficiency; for example, stannous octoate, although very effective as a cure catalyst for alkoxy silane/silanol condensations, is susceptible to oxidation which cart result in haze and thus would not be preferred for use in producing a light pipe having good light transmittance (i.e. a light pipe having less than 1.0 dB/m transmission loss). Those skilled in the art are aware of the large range of reactive additives and catalysts useful for crosslinking the crosslinkable core mixture.

An effective and preferred curing method for a light pipe employs water-promoted silane crosslinking. In this method, a silane functional monomer selected from one or more of the following silanes such as 2-methacryloxyethyltrimethoxysilane, MATS, 3-acryloxypropyltrimethoxysilane, allyltrimethoxysilane, allylmethyldimethoxysilane, 3-methacryloxypropyldimethylmethoxy silane, 3-methacryloxypropylmethyldimethoxysilane, vinyltrimethoxysilane (VTMOS), or vinyltriethoxysilane, is copolymerized with one or more bulk monomer(s), using levels of from about 0.5 to about 12 wt. %, based on the copolymer weight, to produce the uncrosslinked copolymer. The copolymerized silane is typically cured by reaction with water. Among the methoxysilanes, MATS and VTMOS are preferred due to their high purity and availability at relatively low cost. MATS is especially preferred in acrylic-based core polymers due to its copolymerization behavior with (meth)acrylic monomers. In an acrylic-based core for a FLP, MATS is used at levels ranging from the aforementioned 0.5 to 12 wt. %, preferably from about 3 to about 6 wt. %, based on weight of the uncrosslinked copolymer. VTMOS use levels are in the same range, with preferred levels from about 1 to about 4%. One preferred process for preparing an acrylic-based FLP is that in which: a) the uncrosslinked copolymer molecular weight is from about 10,000 to about 150,000 daltons; b) the functionally reactive monomer is used at a level of from about 0.5 to about 12 wt. % of the uncrosslinked copolymer weight and is selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these; and c) the reactive additive is water and a silane condensation reaction catalyst.

A preferred light pipe process employs organoalkoxysilane-functional (meth)acrylates in the uncrosslinked copolymer, and water and a dialkyltin dicarboxylate catalyst, such as dibutyltin diacetate ("DBTDA"), as the reactive additives. In the resultant crosslinkable core mixtures, water facilitates a thermal cure at relatively low concentration (typically from about 0.1 to about 0.4 wt. %, based on the uncrosslinked copolymer weight) and DBTDA, added in neat form via a carrier solvent such as butyl acetate or dibutyl phthalate, may be used at levels of up to about 100 ppm to catalyze the silane-crosslinking cure in the presence of water. The rate at which the silane-containing crosslinkable core mixture described above may be cured depends on several factors, including the Mw of the uncrosslinked copolymer, its silane content, the water (or any other functional additive) concentration, the curing catalyst composition and its concentration, and the curing temperature. For example, with ethyl acrylate-based uncrosslinked copolymers having initial Mw of 50–70K daltons, a 5 wt. % loading of MATS, 30–60 ppm of dibutyltin diacetate and a concentration of 0.1 to about 0.4 wt. % water, requires from about one to ten days, preferably four to seven days to "cure" at 90° C. (A polymer is considered to be "cured" when it can be swelled by a good solvent without extensive disintegration or dissolution.)

The bulk monomer of the above described process and continuous process for a light pipe is preferentially selected from acrylates such as methyl-, ethyl-, normal (n)-butyl-, or 2-ethylhexyl acrylate, or methacrylates such as methyl-, ethyl-, or n-butyl methacrylate, or mixtures of these. Especially preferred is the process wherein the bulk monomer is methyl acrylate, ethyl acrylate, or butyl acrylate or mixtures of these; the functionally reactive monomer is MATS or VTMOS, and the silane condensation reaction catalyst is a dialkyltin dicarboxylate. From this combination, one highly preferred process or continuous process for a light pipe, due to its cost, well-controlled cure rate, and excellent light transmittance, utilizes an uncrosslinked copolymer derived from about 94 to about 98 wt. % ethyl acrylate and from about 2 to about 6 wt. % MATS, and the dialkyltin dicarboxylate is dibutyltin diacetate.

Properties of these last compositions as cores for light pipes are believed to be generally superior and unrecognized as such in the art. Accordingly, there is provided a composition for a light pipe crosslinkable core mixture which comprises:

a) from about 95 to about 99.9 weight percent, based on the crosslinkable core mixture weight, of an uncrosslinked copolymer having weight average molecular weight from about 2,000 to about 250,000 daltons, the uncrosslinked copolymer comprising:
  i.) from about 80 to about 99.9 weight percent, based on the uncrosslinked copolymer weight, of a bulk monomer selected from methyl acrylate, ethyl acrylate, normal butyl acrylate, or mixtures thereof,
  ii.) from about 0.1 to about 20 weight percent, based on the uncrosslinked polymer weight, of a functionally reactive monomer selected from 3-methacryloxypropyltrimethoxysilane or vinyltrimethoxysilane; and
b) from about 0.1 to about 5 weight percent, based on the crosslinkable core mixture weight, of a reactive additive comprising water and a dialkyltin dicarboxylate.

Particularly preferred is the composition wherein:
a) the bulk monomer is ethyl acrylate;
b) the reactive monomer is 3-methacryloxypropyltrimethoxysilane; and c) the dialkyltin dicarboxylate is dibutyltin diacetate.

Most preferred is the uncrosslinked copolymer derived from about 94 to about 98 weight percent ethyl acrylate and from about 2 to about 6 weight percent MATS.

It will be appreciated that in producing a light pipe, particularly one having good light transmittance (i.e. <1.0 dB/m loss), it is important to minimize color and haze, both of which might result from the polymerization reaction, thermal aging or radiative aging. To minimize color and the potential to develop color upon thermal or radiative aging, it is preferred that reactive additives not contain aromatic groups or nitrogen. To reduce excess haze and concomitant light scattering, care must be taken to choose reactive additive(s) which preferably are readily solubilized into the copolymer mixture and which do not yield insoluble products or byproducts. Solubility limits of the additive(s) can be exceeded in the intimately mixed mixture so long as subsequent curing reactions consume the additive(s) and do not produce insoluble byproduct(s). Furthermore, to ensure dimensional stability of the cured composite (product), it is generally not desirable to conduct curing reactions which generate significant amount of volatile byproducts since gradual outgassing of volatile byproducts can cause shrinkage of the cured core. For similar reasons, it is desirable to minimize or eliminate the need for solvent carriers in any cure catalyst stream. One preferred curing chemistry exemplifying these criteria utilizes hydroxyl-functional copolymers and from about 1 to about 10 wt. %, based on the copolymer weight, of previously mentioned dilactone reactive additives; this combination does not generate volatile byproducts, does not require aromatic or nitrogen-containing compounds, and generates crosslinks having color-stable aliphatic esters.

Intimate mixing of the reactive additives into the uncrosslinked copolymer is necessary for optimum curing (uniform crosslinking density) and uniform axial and radial modulus and other physical property development. Methods of mixing reactive additives prior to the coextrusion die include the use of, for example, motionless mixers, impingement mixers, continuous stirred tank reactors (CSTRs) with dispersion mixing impellers and other mixers known in the art. Typically, the reactive additive stream is of low volume relative to the uncrosslinked copolymer volume (e.g. <10%, more typically <2%) and may be of low viscosity (about 1 poise). In the use of a reactive additive stream comprising a functional copolymer, the stream volume could be as large as 50 wt. % of the crosslinkable core mixture. Addition of a reactive additive stream occurs in a mixing device located prior to and close to the coextrusion die.

Other additives may be included in the crosslinkable core mixture. For example, antioxidants, UV absorbers and UV stabilizers known to diminish photo-degradation and thermal degradation may be added. The level of an additive which can be optionally employed will depend upon the absorption spectrum of the additive, the desired composite or light pipe length and spectral distribution for the intended end use. Depending upon the end use, one or more of the following additives can be employed: among UV stabilizers are included, for example, hindered-amine light stabilizers, 2-hydroxybenzophenones, 2-hydroxyphenylbenzotriazoles, and transition metal complexes, such as Ni(II) oxime chelates. UV absorbers include benzophenone-derived compounds, benzoates, benzotriazoles, phenyl salicylates, and the like. Among the antioxidants are, for example, mercaptans, thioesters, phosphites, hindered phenols, hindered-amine light stabilizers, and the like. Other additives which may be included in the crosslinkable core mixture include fluorescent dyes or absorbing dyes affording a particularly desired spectral distribution. Anti-static additives may be used to inhibit dust collection on the ends of light pipes, and release agents may be used to reduce adhesion between the core and the cladding, for the purpose of minimizing stress due to differential thermal contraction.

One or more plasticizers may be an additional component to the crosslinkable core mixture. It is desirable that the plasticizer be very low in volatility (e.g. normal boiling point >300° C.) so that its use does not cause bubble formation during the clad-filling step or affect long-term dimensional stability of the cured composite or light pipe. The plasticizer also should be stable to discoloration under long term heat aging at $\leq 130°$ C. and on long-term exposure to wavelengths longer than approx. 380 nm. Preferred plasticizers are tri-alkyl titrates and aliphatic esters such as triethyl citrate, acetyltriethyl citrate, tri-n-butyl citrate, or diethyl sebacate. It is contemplated that a crosslinkable core mixture having a Tg significantly above 20° C., for example greater than 40° C., such as exhibited by a polymer of MMA or most MMA/BMA copolymers, could be made flexible for use as a light pipe by the inclusion of sufficient plasticizer. Common plasticizers miscible with uncrosslinked copolymers in light pipes and which meet the volatility, stability, and other requirements mentioned previously, and which could serve as "flexibilizing plasticizers" include the aforementioned aliphatic esters, and, in certain cases, polyethylene glycol, polypropylene glycol and the like. Flexibilizing plasticizer use levels would depend upon the use requirements intended for a given light pipe, but generally would increase as the core Tg and the light pipe diameter increase; for example, an uncrosslinked copolymer derived from methyl methacrylate may use from about 1 to about 40 wt. % plasticizer, based on the weight of the uncrosslinked copolymer. For example, it is estimated that an uncrosslinked copolymer derived from >80 wt. %; methyl methacrylate and having a 9 mm core diameter would require approximately 25-40% of one or more flexibilizing plastizer, the weight based on the weight of the crosslinkable core mixture, to achieve FLP flexibility requirements at, and below, 20° C. Based on this, we envision a light pipe process wherein the bulk monomer may be methyl methacrylate, ethyl methacrylate, or normal butyl methacrylate and the crosslinkable core mixture further comprises an additional amount of from about 1 to about 40 weight percent, based on the weight of the crosslinkable core mixture, of a flexibilizing plasticizer.

In synthesizing, conveying and extruding the crosslinkable core mixture for a light pipe, contamination must be minimized. Particulates may be removed from monomers and additives by distillation or filtration through porous media. It is desirable to remove contaminating particulates from starting materials (rather than from the more viscous copolymer or copolymer mixtures) and to avoid subsequent contamination. Monomers may contain undesirable organic impurities, such as amine-or phenol-containing polymerization inhibitors, which may be removed from the monomers by one or more known techniques (e.g. distillation, acid or base wash, acid or basic ion-exchange column, activated alumina columns or recrystallization). Initiators may be purified by distillation or re-crystallization and chain-transfer agents may be purified by distillation. It is desirable to have oxygen absent during free-radical polymerization of acrylates, methacrylates, or other monomers, due to oxygen participation in undesirable, often color-forming side-reactions. Oxygen may be removed effectively from raw materials by one or more known means such as freeze-thaw cycles under vacuum, sparging with an inert gas such as nitrogen, stirring under vacuum or dispersing reactant mixes as fine mists into vacuum tanks.

Beyond minimization of particulate contamination, the type of reactor used for synthesizing the crosslinkable core mixture is not central to the invention. Polymerization reactors useful in preparing the crosslinkable core mixture and adding additives to the crosslinkable core mixture include motionless mixers, re-circulating tubular reactors, batch reactors and continuously stirred tank reactors (CSTRs). A semi-continuous process may be run using two or more batch reactors or CSTRs; batch reactors permit high conversion of residual monomer to copolymer, possibly eliminating the need for subsequent devolatilization of the uncrosslinked copolymer. Both solution and bulk polymerization methods are readily applied to the uncrosslinked copolymer synthesis step of the invention.

To decrease the tendency of the crosslinkable core mixture to form bubbles when passing through the core mixture delivery tube or when contacting and filling the tubular cladding, it is desirable to minimize volatile components in the crosslinkable core mixture. Minimizing volatiles is especially desirable when the cladding melt is above about 150° C., such as for a fluorinated ethylene-propylene copolymer (FEP) resin. Any adequate means to reduce volatiles may be used, such as failing strand or extruder-based devolatilization methods. Advantages of devolatilizing the uncrosslinked copolymer include improved long-term dimensional stability and decreased levels of low-MW impurities which could adversely affect optical performance of a light pipe Residual monomer also may be reduced by adding initiator to a second-stage CSTR, a series of motionless mixers, or in other mixing vessels. If the volatility of residual monomer is sufficiently low as to not cause bubbling during filling of the cladding, then residual monomer may be reduced during the subsequent curing step of the core/cladding composite.

The crosslinkable core mixture is conveyed to a coextrusion die by any of several known means such as a screw pump, gear pump, piston pump, or other such pressure generating device capable of delivering a smooth, pulseless, continuous flow. Gear pumps and piston pumps are preferable as they minimize the potential for particulate contamination of the crosslinkable core mixture due to mechanical wear.

By similar means, a molten cladding polymer is conveyed separately and concurrently to the coextrusion die. The molten cladding polymer may be conveyed to the annular channel of the coextrusion die through the use of a single or multiple screw pump, a gear pump, a piston pump, or other such pressure-generating device capable of delivering a smooth, pulseless, continuous flow. The molten cladding polymer may be converted from pellets or powder in a single or multiple screw extruder, a disk processor, or other such polymer melting device. The device used for melting the cladding polymer and the device used to convey the melt to the coextrusion die may be, but need not be, the same device. A preferred method is to melt the cladding material in a single-screw extruder which feeds said melt to a gear pump to convey the cladding melt to the coextrusion die.

A wide range of polymers may be used as the cladding for a cured composite or for a light pipe. Cladding polymers for a non-light pipe, cured composite may be a transparent, translucent or opaque thermoplastic or thermoset polymer. Examples include polyethylene, linear low density polyethylene (LLDPE), polypropylene, acrylic polymers, polystyrene, polycarbonate, polyvinyl chloride, polyurethane, and various engineering resins and mixtures thereof. Thermoplastic cladding polymers for a light pipe should have a refractive index below that of the core, preferably more than 0.03 refractive units lower, and a Tg or a melting temperature (Tm) above about 50° C. The wall thickness of cladding polymers useful for light pipe range from 0.05 to 2.0 mm for light pipe having a diameter of 3 to 20 mm, and preferably 0.2 to 0.4 mm, for light pipe having a diameter of 3 to 7 mm. Fluorinated polymers are preferred cladding materials and include, for example, fluoro (meth)acrylate/alkyl (meth)acrylate copolymers, the polymer of perfluoroallyl vinyl ether (e.g. Cytop TM resin, Asahi Co.), poly(vinylidene fluoride) (PVDF), copolymers of PVDF with tetrafluoroethylene (TFE) and hexafluoropropylene (HFP); FEP; ethylene-tetrafluoroethylene copolymers; perfluoropropyl vinyl ether (PPVE); and perfluroalkoxy (PFA) resins. It is known that cladding materials of reduced crystallinity, such as certain VDF/TFE/HFP terpolymers, may be advantageous to total transmission of a light pipe, but these are relatively expensive or unavailable. FEP resin is a preferred cladding because of its refractive index, toughness, heat and flame resistance, commercial availability, oxygen barrier properties, and translucence. High heat resistance claddings permit higher temperature during thermal cure cycles, sometimes to advantage, for example when faster cure rates are desired.

The coextrusion die is a critical physical component of the extrusion process of the invention. Multi-feed dies have been used for extruding a wide range of materials, but this invention discloses unexpected advantages afforded by this fabrication method for a cured composite, particularly for a light pipe. From early in the history of plastic light conduits, it had been assumed that rubbery core materials were not conducive to coextrusion into a thermoplastic tube (e.g. see GB 1,037,498). The art for preparing rubbery light pipe has overlooked or taught against such a process. For example, EP 202,578 ("'578") disclosed that traditional tube filling was considered, but abandoned due to light losses of 5000 dB/km at 650 nm attributed to the surface roughness of the FEP clad, lack of adhesion and the shrinkage from the cure. '578 also taught that the maximum length for such a "pre-polymer-filled" tube was about 10 meters. The processes disclosed herein have single wavelength losses as low as 650 dB/km, enable continuous production lengths, and are carried out without special precautions to decrease the roughness of the inner surface of the clad tube, without any attempt to maintain large or uniform air gaps, without rapid cures, without slow, complex casting procedures, without employing all-rubber (i.e. core and cladding components each having Tg's less than about 20°-30° C.) systems and without relying upon the high interfacial adhesion that all-rubber core/cladding systems are designed to provide. This invention does not establish or attempt to establish a relatively narrow and uniform air gap between the core material and the cladding as taught in U.S. Pat. No. 4,957,347. Rather, this invention attempts to exclude air from between the core material and the cladding such that substantially complete contact is made between the core material and the cladding. When substantially complete contact exists, there is no relatively narrow and substantially uniform gap of air, no large air gaps, no uniform gap of air, and no loose fit of the core material and the cladding.

The optimal design for the coextrusion die depends on the chemistry of the crosslinkable core mixture, the polymer employed as the cladding material, the dimensional requirements of the light pipe and optionally the polymer employed as the sheathing material. The critical elements of the coextrusion die (comprising the core mixture delivery robe ("delivery robe") and the annular channel) are that it insulate the crosslinkable core mixture stream from excessive heat from the cladding polymer and that it guide the crosslinkable core mixture in filling the cladding tube. The exit tip of the core mixture delivery tube may be used as a steadying, stabilizing or guiding device for the cladding polymer.

Figure 2:
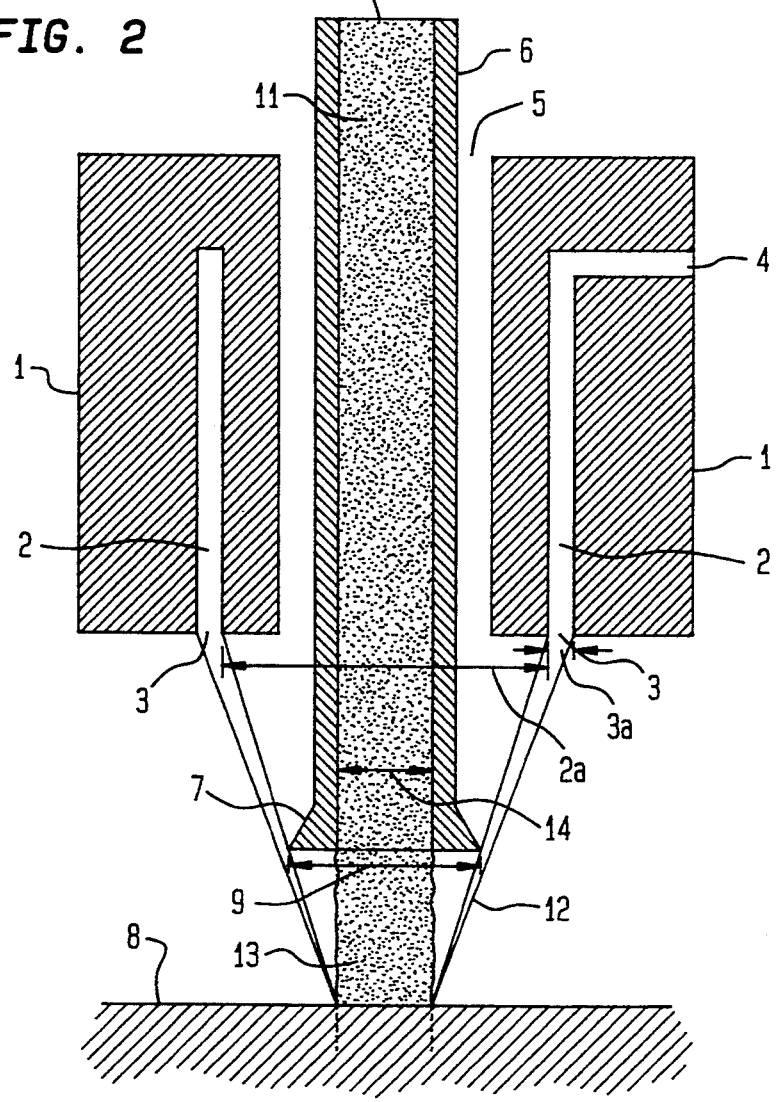
FIG. 2 is of the cross section of a coextrusion die useful for producing light pipe and FLP of the invention.

FIG. 2 is an illustration of the cross section of a coextrusion die useful in the invention. The outer die block (1) of the coextrusion die provides for an annular channel (2) with an annular gap exit (3) with a circular cross section at the exit for exiting of the molten cladding polymer. The molten cladding polymer is fed via the conveying means discussed earlier to the entrance of the annular channel (4). The outer die block (1) is maintained at a prescribed temperature via oil, steam, electrical heating or the like, and is well insulated to maintain a constant temperature. The annular channel (2) may be varied in both diameter (2a) and gap width (3a) to produce an end product with different dimensions. The outer die block (1) is also fit with an inner channel preferably of circular cross section (5) that runs generally parallel to the centerline of the annular channel (2) in the outer die block (1). Through this inner channel (5) a core mixture delivery tube (6) of smaller diameter than the inner channel (5) is placed such that the axis of the core mixture deliver), tube (6) is generally coaxial with the axis of the annular channel (2) and the axis of the inner channel (5). The inner channel (5) between the outer walls of the core mixture delivery tube (6) and the inner walls of the outer die block (1) may be insulated, evacuated or filled with air, nitrogen or other gas for purposes of insulation and temperature control.

The core mixture delivery tube (6), which delivers the crosslinkable core mixture may be a simple single-walled tubular construct or optionally fit with a second wall, creating an additional insulating can The core mixture delivery tube (6) may be fitted with a means for actively cooling the crosslinkable core mixture such as a cooling coil. The exit end (7) of the core mixture delivery tube (6) may be flush with the exit of the annular channel (3) or may protrude some distance past it. The diameter of the core mixture delivery tube (6) may vary throughout the length of the tube, typically at the discharge end of the tube where the diameter may change over some length to a final exit outside diameter (9). The core/cladding composite is extruded into a cooling bath (8), typically a water bath, an adjustable distance below the outer die block (1). The exit end (7) may protrude below the cooling bath (8) surface.

The molten cladding polymer is conveyed to the outer die block (1), and is driven by pressure through the annular channel (2) and annular channel exit (3) where it is drawn down in diameter and formed into a cone shape by action of an appropriate take-up device before being quenched below its melting point in the cooling bath (8). The final diameter of the cladding polymer and the cladding wall thickness are determined by the take-up speed of the take-up device, the diameter (2a) and gap width (3a) of the annular channel exit (3), the air gap between the outer die block (1) and the cooling bath (8), and optionally, the exit outside diameter (9) of the core mixture delivery tube (6).

To improve the quality of the outer cladding surface, a water ring may be employed beneath the bath surface, as known in the extrusion art. Various types of water rings may be used, typically a circular shaped water ring is utilized for light pipe fabrication. The water ring enhances water flow over the cladding surface, preventing localized boiling of the cooling bath water and aiding uniform cooling. Other cooling or coolant circulation methods, as known in the art, may also be employed. It is understood that free extrusion, as exemplified herein, uses the water bath as a component of the sizing technique. Other sizing methods known in the art, although not exemplified herein, are understood to be within the scope of this invention. Such sizing methods may incorporate the use of one or more of the following: horizontal extrusion, a water bushing (or other calibrators), or vacuum sizing techniques.

The crosslinkable core mixture is conveyed to the entrance (10) of the core mixture delivery tube (6) and down the length of the tube through the inside channel (11). The crosslinkable core mixture discharges out the exit end (7) of the core mixture delivery tube (6) and into the cone (12) of molten cladding polymer (12). The rate of the crosslinkable core mixture (13) is controlled in such a way that it neither over-fills nor under-fills the cone of molten cladding polymer (12).

From FIG. 2, the critical dimensions are the inside diameter (14), the exit outside diameter (9) of the core mixture delivery tube (6), the gap width (3a) and diameter (2a) of the annular gap exit (3), the distance from the core mixture delivery tube exit (7) to the cooling bath surface, and the distance from the outer die block (1) to the cooling bath surface. It is preferred that the exit outside diameter (9) of the core mixture delivery tube (6) be equal to or greater than the diameter of the cured core (cured crosslinkable core mixture) of the composite or light pipe, and no greater than 4 times the diameter of the cured core; the range is 1 to 4, preferably between 1.1 and 2 times the diameter of the cured core. It is possible to use a core mixture delivery tube (6) with an exit outside diameter (9) which is equal to or smaller than the diameter of the core of the resulting composite, light pipe or FLP ("cured core"—equivalent to cured crosslinkable core mixture), allowing the core mixture delivery tube (6) to extend below the cooling bath surface. The diameter of the cured core is substantially equivalent to the internal diameter of the extruded cladding.

The gap width (3a) of the annular channel gap exit (3) should be equal to or greater than a final wall thickness of the extruded tubular cladding polymer, and no greater than 20 times the desired final wall thickness; the preferred gap width range is between 4 and 16 times the thickness of the extruded tubular cladding polymer.

The preferred distance between the cooling bath surface (or other cooling device) and the exit of the core mixture delivery tube is preferably less than 20 times the diameter of the cured core, more preferably between 0.5 and 10 times the diameter of the cured core. For delivery tubes having an outside diameter equal to or smaller than the diameter of the cured core, the exit of the core mixture delivery tube may be on either side of the cooling bath surface.

The diameter (2a) of the annular channel for the cladding polymer should range between about 1 to about 15 times a diameter of the cured core of the composite or light pipe; the preferred range should be between about 1.5 to about 7 times a diameter of the cured core of the composite or light pipe.

The distance between the outer die block (1) and the cooling bath surface should be equal to or greater than 1 and no more than 20 times a diameter of the cured core of the composite or light pipe, with a preferred range between 2 and 10 times a diameter of the cured composite or light pipe.

The inside diameter (14) of the core mixture delivery tube (6) should be between 0.75 and 3 times a diameter of the cured core of the composite or light pipe; a preferred range between 1 and 2 times a diameter of the cured core of the composite or light pipe.

The process of the invention advantageously accommodates a wide range of thermally-promoted crosslinking chemistries which are decoupled from the extrusion and filling steps. Some of these include free-radical reactions with unsaturated bonds or operating via hydrogen extraction (typically peroxide-initiated reactions), condensation or ring-opening cure chemistries such as by esterification, urethane formation, epoxy- and lactone-based reactions, condensations via silanes, and the like. Other useful crosslinking reactions include diamine crosslinks of (meth)acrylate-based systems and transesterification reactions such as the organotin-catalyzed reaction between polymers which incorporate vinyl monomers, such as vinyl acetate, and polymers which incorporate (meth)acrylic monomers such as methyl acrylate or methyl methacrylate. Similarly, transesterification could be used to crosslink a copolymer which incorporates both vinyl and (meth)acrylic functionality. To facilitate control and decoupling of their respective steps, it is preferred that synthesis of the uncrosslinked copolymer and subsequent cure of the crosslinkable core mixture employ different mechanisms (e.g. free-radical synthesis and condensation reaction curing; or polyurethane synthesis and free-radical curing). Curing may be promoted by any known method, for example by photocuring (as in EP 469 673) or by electron beam curing; by heat, by microwave, by ultrasound, and the like. For example, photocuring may be especially desirable for transparent rubber cross-sections having short optical pathlengths (such as in sheet materials), or for light pipes used where yellowness is not detrimental, or in FLPs employing UV photoinitiators such as the azo-type initiators which do not leave behind residues with large visible absorption. Heat curing by infra-red radiation, as in a heated oven or by infra-red lamps, may be used to promote curing and is preferred for the FLP of the process of the invention. In its broadest scope, the invention provides for the practice of a wide range of chemistries and the means of promoting those chemistries, and it is integral to the invention to separate the curing step from the core/cladding fabrication steps of extruding and filling. A key criterion for this step separation is that cure rate is sufficiently slow as to prevent fouling due to gel formation at the fabrication tip of the core mixture delivery tube.

Applying an optional sheathing- to a light pipe or FLP employs techniques known in the art. The protective sheathing may be applied to the light pipe or FLP at any time simultaneous to or following the filling step. The sheathing may be a transparent, translucent or opaque thermoplastic or thermoset polymer. Optionally, a sheathing may comprise both opaque and transparent or translucent components, such that side emission is preferential in one or more directions. Examples of useful sheathing materials include polyethylene, linear low density polyethylene (LLDPE), polypropylene, acrylic polymers, polystyrene, polycarbonate, polyvinyl chloride, polyurethane, and various engineering resins, and mixtures thereof. The sheathing material may be colored or contain absorptive and/or fluorescent dyes. It may contain flame retardants, crosslinking additives, or light scattering materials such as an immiscible polymer, particulate inorganics such as $TiO_2$, or forward-scattering organic particles such as Plexiglas L ™ acrylic resin.

Products will result from the above-identified processes, such as:

A product (such as a light pipe or FLP) by the process of:
- a) concurrently and coaxially extruding
  - i.) a molten fluoropolymer through a annular channel of a coextrusion die to form an extruded tubular fluoropolymer cladding, and
  - ii.) a crosslinkable core n-fixture through a core mixture delivery tube of the coextrusion die to form an extruded crosslinkable core mixture within the circumference of the extruded tubular fluoropolymer cladding;
- b) filling the extruded tubular fluoropolymer cladding with the extruded crosslinkable core mixture; and
- c) curing the extruded crosslinkable core mixture within the extruded tubular fluoropolymer cladding wherein the cured extruded crosslinkable core mixture and the extruded tubular fluoropolymer cladding are in substantially complete contact. Steps a), b) and c) may be continuous.

Products from the above-identified process may have the following properties:
- a) good light transmittance, wherein the diffuse white light transmission loss is less than or equal to 1.0 decibel per meter, and wherein the differential transmission loss between light wavelengths of 400 nm to 600 nm is equal to or less than 1.0 decibel per meter as measured by a "cutback" interference filter method (described below); or
- b) good thermal stability, wherein a change in the differential transmission loss between light wavelengths of 400 nm to 600 nm is equal to or less than 0.5 decibel per meter after 50 days of exposure to a temperature of 90° C., as measured by a non-destructive interference filter method (described below); or
- c) good flexibility, wherein the product, at 20° C., survives without core fracture a 180° bend at a bend radius which is less than or equal to five times the diameter of the cured core; or
- d) good hardness properties, wherein the Shore "A" hardness is less than 90 after 50 days of exposure at 120° C.; or
- e) good light transmittance wherein the differential transmission loss between light wavelengths of 400 nm to 600 nm is equal to or less than 1.0 decibel per meter as measured by the "cutback" interference filter method; good thermal stability, wherein a change in the differential transmission loss between light wavelengths of 400 nm to 600 nm is equal to or less than 0.5 decibel per meter after 50 days of exposure to a temperature of 90° C., as measured by the non-destructive interference filter method; good flexibility, wherein the product, at 20° C., survives without core fracture a 180° bend at a bend radius which is less than or equal to five times the diameter of the cured core mixture; and good hardness properties, wherein the Shore "A" hardness is less than 90 after 50 days of exposure at 120° C.

Light pipes and FLPs are often coupled to high-flux illuminators, such as the GE Light Engine ™, for conveying bright light to a desired use point (end-lit applications) or illumination or decoration utilizing the length of the light pipe (side-lit, side-emission or "neo-neon" applications). Other useful sources include, but are not limited to, direct solar light, focused solar light, fluorescent lamps, high-, medium- and low-pressure sodium lamps, quartz-halogen, tungsten-halogen and incandescent lamps.

Some additional uses for the core/cladding composites, light pipes and FLPs prepared by the process of the invention include: automotive and transportation uses, such as in headlights, rear appliqués, interior lighting, dashboard lights, accent lights, map readers, and the like; retail lighting uses, such as in track lighting, display cases, point of purchase displays, and the like; emergency lighting, such as in path of egress, exit signs, pathway indicators, and the like; to indoor and outdoor commercial lighting, such as in down lights, recessed solar collectors, ground level lighting, walkway lighting, airport runway lights, architectural lighting; to remote source systems, such as in prison cells, hazardous environments, zoos, aquariums, art museums, and the like; residential lighting, as in novel lighting for showers, vanities; specific task lighting, such as auto mechanic lighting, surgeon/dentist lighting, "high tech" manufacturing lighting, endoscopes, photographic uses, and the like; signs, such as in neo-neon, edge lit signs with plastics such as Plexiglas ™ acrylic resins, video/electronic displays, highway signs, and the like; and, other specialty lighting, such as in toys, underwater lighting, in deep sea diving, biological research-catalyzing culture growth, plant growth, and the like. Other possible uses include: ionically conductive multilayer films with flexible cores for electrochromic displays, non-metal resistance heaters, touchpads and artificial muscles; chemiluminescent devices; films for safety glass inner layers; fluid layers for puncture healing; thermochromic devices with fast temperature response; and easy-to-handle hydrogels. The process of the invention provides products capable of meeting these needs or applications; particularly provided are flexible light pipes made according to the process described.

The following non-limiting examples show several means of conducting the process of the invention and include syntheses and production of core/cladding composites and FLPs, and some of their properties and uses, illustrative of the invention. One skilled in the art can easily integrate the synthesis and production steps (as exemplified herein) into a coupled, continuous means for fabricating composites, core/cladding composites or light pipes.

EXAMPLES

General

Optical Testing

Transmission loss of a FLP produced by the process was tested using the "cut-back" technique, quantified by the equation:

$$\text{Loss } (dB/m) = \frac{10}{(L_1 - L_2)} \times \text{Log} \frac{(I_2)}{(I_1)}$$

where $L_1$ & $L_2$ represent the lengths in meters before and after cutting and $I_1$ & $I_2$ represent the corresponding output intensities of the light pipe. Samples were typically 2–5 meters in length and were illuminated at one end. The output intensity was measured, a portion of the sample (typically 15 cm to one meter in length) was cut off, and the intensity was remeasured. This process was repeated until the remaining sample length was about 1–1.5 meters. While several two-point cutbacks were employed, loss curves typically employed 7–12 data points. An exponential fit of the resulting plot of output intensity vs. cut-back distance, as interpreted through the above equation, yields the optical transmission loss. The light source employed was a quartz-halogen microscope illuminator. The output of the illuminator was filtered with a hot mirror to remove most of the infrared and UV radiation from the light beam. In many cases, a light diffuser was placed between the hot mirror and input end of the FLP to ensure filling of the light pipe's numerical aperture. Filling the numerical aperture increases losses from interfacial reflections and increases the effective path length taken by the light, and represents a "worst case" test for transmittance. To facilitate the testing of loss for specific portions of the visible spectrum, various interference filters were employed and the diffuser was omitted, except as noted. Because the wavelength-dependent loss determinations will be affected somewhat by the specific spectral characteristics of the sources, filters & detectors, these are described here in detail: The 5 cm diameter interference filters were manufactured by Melles-Griot: model numbers, and nominal peak wavelengths are as follows, with actual wavelength at maximum transmittance (max), the full width at half maximum (FWHM) and center wavelength at half maximum (CHM) as taken from the manufacturer's calibration of the individual filters are reported in parentheses: 03 FIB 002 400 nm (max=395 nm; FWHM=66 nm, CHM=405 nm); 03 FIB 008, 550 nm (max=541 nm, FWHM=76 nm, CHM=556 nm); 03 FIV 046=600 nm (max=605 nm, FWHM=36 nm, CHM=600 nm). Filter-to-filter differences for the 550 nm and 600 nm filters are relatively unimportant, particularly for monitoring changes in color as in the aging experiments, due to the low and essentially wavelength-independent losses typical of this spectral region. More critical is the selection of the 400 nm filter: the absorption monitored is often the edge of a much larger peak in the UV. Therefore, a filter with comparable characteristics should be obtained (approx. ±5 nm in all specifications). Source spectral and angular distribution will also impact color measurements: a Fibre-Lite Model 190 microscope 30-W quartz-halogen illuminator was employed. The illuminator yeas equipped with the standard fiber-optic neck, but without the optional lens, was operated at the medium-intensity setting and was used in conjunction with a voltage regulator to stabilize output. The relative geometry of the detector, the FLP under test, the outlet fiber optic of the illuminator, and the optical filters must be well defined to ensure a reproducible test. As used herein, the outlet end of the FLP was clamped into the detector and both the inlet end of the FLP and source were clamped to the filter holder while exchanging filters in order to eliminate sample alignment variation. In our color experiments, output intensity for optical measurements was monitored with a Labsphere Inc. integrating sphere equipped with a SDA-050-R silicon photodiode detector and mask. Care should be taken to prevent stray light from entering the detector, and the measurements should be performed in a darkened room.

Generally, use of narrower-bandpass 400 nm filters should yield color determinations (differential losses) which are more independent of source and detector properties. For the source and detector used herein, narrower bandpass 400 nm filters also yielded higher measured differential losses. The "cut-back" interference filter method employed interference filters to measure output intensity before and after diffuse white light cut-back tests, effectively comprising a two-point cut-back technique. The method is better suited to color tests (differential losses between two wavelengths) than absolute loss determinations, due to differences in the pre- and post- cut-back sample/detector geometry. Geometry differences directly impact absolute loss values, but should not significantly affect differential loss measurements made using two filters of differing peak wavelengths.

For the tests hereto, the term "wavelength" is sometimes used to refer to the range of wavelengths transmitted by an interference filter. Similarly, the nominal peak wavelength of an interference filter (such as "400 nm") is often used to refer to the range and distribution of wavelengths transmitted by the filter when coupled to the source described herein.

Scattering Loss

Scattering loss was estimated on unsheathed FLPs by measuring output intensity with the aforementioned integrating sphere, then unblocking the rear port of the sphere and passing the FLP completely through the sphere and measuring the intensity of light emanating from the sides of the FLP. Because of back reflection from the cut end, the integrating sphere was moved along the FLP toward the source until a minimum in the side emission was found (typically <0.5 m from the end of the FLP). The sum of the side emission minimum and the end emission intensity was ratioed to the end emission intensity using the cutback equation described previously. In this calculation, the known length of the FLP contained within the integrating sphere during the side emission measurement (8.25 cm) is the "loss" distance ($L_1-L_2$). Estimated scattering losses were typically $\geq 50\%$ of the measured total loss. Observed particulate levels in the core material of FLPs correlated strongly with the observed scatter and total losses. It is believed that the low optical losses disclosed herein for FLPs produced by the process of this invention will be even further reduced by continued diligent application of the described techniques and principles.

Hardness Measurement (Shore "A" Hardness)

The resistance of the cured core to hardening was measured using a Type "A" Shore durometer, mounted on a DRCL-71101 Shore Operating Stand. Samples were 6 mm long pieces of 5 mm diameter core material (the cladding stripped away), placed "end-up" on the stage of the durometer apparatus. Because hardness values drifted slowly downward on all samples except those with the hardest (>90) reading (generally, values above 90 were not recorded), hardness values were acquired 30 seconds after the start of measurement. Shore "A" hardness was assessed prior to and at various points of a heat aging test. An extended heat aging sample (1200 hrs) was not tested prior to aging, but was compared to a room temperature control. Aging was performed at 120° C. in a forced air oven.

Thermal Degradation Tests

Heat and light are both known to cause discoloration, as in the form of yellowness (blue absorption), in many plastics. The effects of thermal aging upon the transmitted spectral distribution (color) have been monitored with a non-destructive interference filter method. This method employed sections of light pipe either 1.5 or 2.5 m in length and the source, integrating sphere and interference filters described previously. For white light measurements, the excitation was restricted mainly to the visible spectrum through use of a hot mirror. The sample length was measured, its transmission was monitored with various filters, it was aged and then remeasured. Alternatively, values obtained on a room temperature control of the same length could be substituted for initial, or "pre-aging," results. Because absolute losses were not assessed through cut-back, changes were monitored through the ratio of short wavelength transmission values relative to transmission at 600 nm: Absorption at such long wavelengths was relatively unaffected by degradation, except in the most severe cases. Because only changes in transmission are studied, reflective losses and refractive index dispersion effects can be neglected. Transmission at 550 nm vs. 600 nm was used as an "internal control": due to the proximity of these wavelengths, and the nature of the discoloration phenomenon (broadening of UV absorptions into the visible), no significant changes were expected for mild to moderate discoloration. Percentage decreases in the ratio of short wavelength to 600 nm transmittance were treated as loss percentages over the length of the sample, and interpreted in terms of the cutback equation described previously. The resultant values are termed the "changes in differential loss".

Flexibility Measurements

Flexibility was tested at various temperatures using an instrument designed for smoothly varying the bend radius and providing a failure criterion of core material fracture. The test apparatus comprised an 8" diameter, six-jaw lathe chuck situated horizontally on a flat surface. Four jaws, positioned to define a 180° bend, were used to approximate an "adjustable diameter mandrel." Each jaw had two azimuthal slots cut in different radial positions to hold a light pipe, which was usually sheathed. The bend diameter range which could be investigated by the device was from about 2.5 to 20 cm. Samples were at least six times the bend radius in length. The samples and the lathe chuck were thermally equilibrated in an environmental chamber for at least one hour prior to testing. The sample was then placed into appropriate slots in the fixture, which had been preset to the desired test radius. The sample was held in position for one minute and removed, and tested for light transmittance. Flexibility failure was readily detected by decreased transmission of the light pipe. All cured products of the following Examples which were tested passed a 2.5 cm radius bend test at 23° C. The sheathed products of Examples 12, 14a, 14b, 20, 21, 22, 23, and 24, below, were tested using the lathe chuck apparatus and method described. The unsheathed products of Examples 17 and 18 (7 mm samples), 15, 16, and 19, below, were tested by wrapping around a solid, 2.5 cm radius mandrel. The solid mandrel was used to distribute force evenly, thus minimizing kinking of the FEP cladding.

FLP Production Apparatus

Light pipes without functionalized copolymer and FLPs were produced in the extruding and filling apparatus of FIG. 2 and its accompanying description. Dimensions of the dies and spaces are provided in production example descriptions below.

Material Preparation and Purification (Meth)acrylic monomers were purified by passing through a column of acidic activated alumina. The column terminated in-a stacked series of cartridge filters, beginning at 5–10 μm and ending at 0.1 μm. Azobis isobutryonitrile initiator was purified under subdued light (absence of fluorescent lighting) by dissolving in toluene, filtering through a 0.1 μm filter, recrystallizing from toluene and then recrystallizing from methanol, followed by vacuum drying in the dark at 25° C. and approximately 20 torr. The functionally reactive comonomer, 3-methacryloxypropyltrimethoxysilane (MATS), and the chain transfer agent, n-dodecyl mercaptan (n-DDM) were used as received from the manufacturer. Catalyst and carrier were dibutyltin diacetate and butyl acetate, respectively, except as otherwise noted. Catalyst solutions and water were degassed with agitation under vacuum, then blanketed under nitrogen during feeding.

Residual monomer was gravimetrically estimated after heating samples of uncrosslinked copolymer in an oven at 130° C. at 20–30 mm Hg.

Examples 1 through 8 and 26 describe syntheses of copolymers used for tests in later production Examples, 9-25 and 27.

EXAMPLE 1

Preparation of a 95 EA/5 MATS Uncrosslinked Copolymer; Mw 60–75K

Multiple runs were conducted in preparing a 95 EA/5 MATS copolymer using the following procedure. Prior to running a reaction, filtered solvent was run through the reactor with agitation to clean out particulate contamination. Particulates were visualized by inspecting the solvent and polymer reactor effluents with a He—Ne laser, checking for small-angle scatter.

Monomer mixes were prepared as follows: To a 5 liter ("L") glass round-bottom flask were added and mixed 3800 g of uninhibited ethyl acrylate, 200 grams of the functionally reactive monomer, 3-methacryloxypropyltrimethoxysilane (MATS) (5 wt. % based on monomer weight (b.o.m.)), 2.40 g. of initiator (recrystallized 2,2'-azobis(2-methylpropanenitrile) (0.06 wt. %) and 40 g of n-dodecyl mercaptan (1 wt. %). The mixture was sparged for at least 10 minutes with nitrogen and degassed under 25–50 mm Hg pressure for at least 10 minutes.

The monomer mix was fed through a 0.1 micron PTFE membrane cartridge filter to either a 2000 mL stainless steel CSTR or a 600 ml CSTR in tandem with a 450 ml CSTR. During polymerization, flow rates for the 2000 ml CSTR were ca. 50 g/min and for the tandem CSTR were ca. 10–25 g/min. All CSTR's were equipped with multiple blade 45° pitch turbine agitators. During polymerization, the reactors were held at 124±20 to 137° C., agitated at 185 to 500 rpm under a pressure of 900 to 1400 KPa (130–200 psi). Reactor effluent (copolymer and residual monomer) was fed through a back-pressure valve set nominally at 1035 KPa (150 psi) into a devolatilization column comprising a stainless steel twisted-tape motionless mixer (60 cm in length with a jacket of about 50 cm length) mounted on an 8-L (ca. 2-gallon) stainless steel catchpot. Heating oil recirculated through the column jacket was held at 170°–200° C. at the jacket inlet. The catch-pot was held at 100°–110° C. and less than 10 mbar vacuum during devolatilization. To minimize the entry of oxygen and particulates into the catch-pot through vacuum leaks, the catch-pot was enclosed in an autoclavable polypropylene bag filled with 0.1 micron-filtered nitrogen. Upon completion of the polymerization, the catch-pot was back-filled with filtered nitrogen. Two and one half monomer mixes, prepared as described above, were fed through the reactor to the 8-L catch pot under the conditions described.

The weight-average molecular weight (Mw) of the reactor effluent copolymer for the multiple runs conducted by the procedures of this Example was 60–75K, and the monomer-to-polymer conversion of the effluent was approximately 87–92%, as measured gravimetrically. Mw of the copolymer was not affected by devolatilization. Gravimetrically determined solids content of the devolatilized polymer typically was ≧99 wt. %.

EXAMPLE 2

Preparation of 95 EA/5 MATS Uncrosslinked Copolymer; Mw ca. 70K

This polymerization was run according to the conditions of Example 1, except for the following changes: The initiator was 1,1'-azobis(cyclohexanecarbonitrile), and the loading was 0.064 wt. %, b.o.m. The 2000 ml reactor was employed using monomer mix flow rates of 50–70 g/min. An 8-L (ca. 2-gallon) or a 20-L (ca. 5-gallon) stainless steel catch-pot was used. The 20-L catch-pot showed no signs of leakage (pressure increase) after being evacuated to a pressure of 4 mbar, sealed and left for 10 hrs, so no external bag with filtered nitrogen was utilized. A total of 5 monomer mixes, as described in Ex. 1, were fed through the reactor and into the 20-L catch-pot.

The conversion and the Mw of the reactor effluent and the devolatilized copolymer were essentially those reported for Example 1.

EXAMPLE 3

Preparation of a BA/BMA/MATS Uncrosslinked Copolymer

Into a 5-L round bottom flask were weighed 2594 g of uninhibited butyl acrylate, 864 g of uninhibited butyl methacrylate (the BA/BMA mixture approximately 75/25 by wt.) and 42 g of MATS (1.2 wt. %, b.o.m). A multi-stage initiator package was used to avoid excessive exotherms within the motionless mixer reactor (described below) and to ensure a free radical supply throughout the reaction period. The initiator package contained 0.055 wt. % 2,2'-azobis(2,4-dimethylpentanenitrile), 0.046 wt. % 2,2'-azobis(2-methylbutanenitrile), 0.050 wt. % 1,1'-azobis(cyclohexane carbonitrile), all %'s b.o.m. The chain transfer agent was n-dodecyl mercaptan, employed at 0.60 wt. %.

The mixture was sparged for at least five minutes with nitrogen and degassed for at least 10 minutes under 25–50 mm Hg pressure. The degassed mix was held under a blanket of 0.2 μm-filtered nitrogen while being pumped at ca. 10 g/min through a 0.2 μm planar membrane filter into a series of five jacketed twisted tape style motionless mixers. The series of static mixers had an internal diameter of 1.1 cm, a length of 3.9 m, and a volume of 450 ml. The first zone (1 meter in length) was held at approx. 90° C., the second zone (1.2 m) at approx. 101° C., and the third zone (1.6 m) at 116–127° C. Process pressure was between 345 and 520 KPa (50–75 psi). The reactor effluent was collected in polypropylene containers or glass flasks and blanketed with 0.2 μm-filtered nitrogen. Conversion to copolymer in the reactor effluent was between 88 to 91 wt. %, as measured by a refractive index technique which had been referenced to gas chromatographic measurements.

EXAMPLE 4

A 98.5 EA/1.5 MATS Uncrosslinked Copolymer

The monomer mix of this Example was similar to that of Example 1, except that the MATS level was 1.5 wt. % b.o.m., the n-DDM level was 0.7 wt. % and the initiator was 1,1'-azobis(cyclohexane carbonitrile). The reactor configuration and operating conditions were similar to those of Example 1, except that a single 450 mL CSTR was used, the agitator was set at 650 rpm, a 0.2 μm planar filter was used, and no devolatilization was employed. The reactor effluent was collected in rinsed polypropylene containers which were blanketed with 0.2 μm-filtered nitrogen. Conversion to copolymer in the reactor effluent was between 88 to 91 wt. %, as measured by a refractive index techniques which had been referenced to gas chromatographic measurements.

EXAMPLE 5

Preparation of 100 EA/0 MATS Polymer Control; Mw ca. 127K

The monomer mix used in preparing this EA control polymer was similar to that of Example 1, except that no functionalized monomer (MATS) was employed and the n-DDM level was 0.6 wt. % b.o.m.. The reactor configuration and operating conditions were similar to those described in Example 4. The reactor effluent was collected in rinsed polypropylene containers which were blanketed with 0.2 μm-filtered nitrogen. Monomer-to-polymer conversion in the effluent was not measured, but can be assumed to be approximately 88–92 wt. %, based on results with similar runs. Mw of the effluent was approximately 127K.

EXAMPLE 6

Preparation of a 95.5 EA/4.5 MATS Uncrosslinked Copolymer; Mw ca. 92K

The monomer mix of this example was similar to that of Example 1, except that the MATS level was 4.5 wt. % b.o.m. and the n-DDM level was 0.8 wt. % b.o.m. The reactor configuration was similar to that described in Example 1 except that a 0.2 μm planar filter was used and the devolatilizing motionless mixer was held at 150° C. Monomer-to-polymer conversion of the reactor effluent was measured gravimetrically and found to be approximately 87 wt. %. Mw of the devolatilized copolymer was approximately 92K, and the gravimetric solids level was about 97 wt. %.

EXAMPLE 7

Preparation of a 98 EA/2 MATS Uncrosslinked Copolymer; Mw ca. 112K

The monomer mix of this example was similar to that of Example 6, except that 2 wt. % b.o.m. MATS was employed, the n-DDM level was 0.7 wt. % b.o.m., and 7.25 wt. % water, based on the MATS weight, was added to the mix. The reactor configuration and operating conditions were similar to those of Example 6, and devolatilization was conducted by passing the reactor effluent directly from the back-pressure valve, which was held at 110° C., to the receiver, a 5-L flask held at 90° C. by a heating mantle. Monomer to polymer conversion was measured gravimetrically and found to be approximately 90 wt. %. Mw of the devolatilized copolymer was approximately 112K, and the final gravimetric solids level was about 98 wt. %.

EXAMPLE 8

Preparation of a 94 EA/6 MATS Uncrosslinked Copolymer; Mw ca. 28K

The monomer mix of this example was similar to that of Example 1, except that 6 wt. % b.o.m. MATS was employed and the n-DDM level was 2.0 wt. %. The reactor conditions and configuration were similar to those described in Example 1, using a single 600 ml CSTR and the described mixer at 167° C. Conversion of the reactor effluent was measured gravimetrically and found to be approximately 90 wt. %; Mw was about 28K.

Examples 9-25 and 27, following, describe various control and production runs of core/cladding composites and light pipes.

EXAMPLE 9

Production of a FLP having a BA/BMA/MATS Uncrosslinked Core Copolymer

The acrylic core copolymer (reactor effluent) described in Example 3 was transferred front a 5-L glass round bottom flask to a 6.4 L stainless steel degassing vessel. The copolymer was heated to 100° C. and stirred at 50 RPM with a helical blade agitator for 1.5 hours. Vacuum was applied to the vessel at a rate of 5 mm Hg./15 minutes until ca. 30 mm Hg. was attained. The agitator was stopped and the copolymer held at 30 mm Hg. and 100° C. for 3 hours.

The vessel containing the copolymer was pressurized to 70 kPa (10 psig) with filtered nitrogen and fed via electrically heated trace lines to a melt pump. The melt pump metered the copolymer at a rate of 34.5 grams/minute to an in-line edge-sealed motionless mixer. The motionless mixer was 1.1 cm inside diameter, 42.5 cm in length and contained 21 helical mixing elements. A piston pump was used to deliver a sidestream to the entrance of the motionless mixer. The sidestream was added to the copolymer stream at a rate of 1.2 g/minute and consisted of 0.19% dibutyltin dilaurate, 3.6% water, 0.48% Vazo 88 and 96% dibutyl phthalate by weight. These components were kept under active agitation during pumping to prevent separation of the multiple phase mixture. The mixer temperature was maintained at 100° C., so that the viscosity of the copolymer mixture was about 200 poise.

The core (or crosslinkable core) mixture was passed from the mixer to a core mixture delivery tube that was mounted along the axis of a coextrusion die, described herein and in FIG. 2. The delivery tube was thermally isolated from the rest of the coextrusion die by a 3.1 mm air gap and ceramic spacers. The coextrusion die was attached to an extruder and mounted in a position that allowed the extrudate to drop vertically into a quenching bath. A FEP cladding resin was melted in the extruder and pumped through the die at a rate of 20 grams/minute and at a temper attire of 320° C. A FEP melt cone was pulled vertically from the coextrusion die and over the core mixture delivery tube so that the distance between the outer die block and the exit of the core mixture delivery tube was 3.1 cm. The distance between the core mixture delivery tube exit and the water bath surface was 2.5 cm. The outside diameter of the annular channel exit of the coextrusion die was 21.7 mm. The inside diameter of the same annulus was 18.5 mm and the gap width of the annulus was 1.63 mm. These annular channel exit dimensions were held constant for all of the production examples. The outside diameter of the core mixture delivery tube exit was 5.3 mm and the inside diameter was 3.8 mm. The core mixture that issued from the core mixture delivery tube filled the base of the FEP cone and the resultant core/cladding composite was immediately quenched. The core/cladding composite was pulled from the water bath at a constant speed of about 3.6 meters/minute using a belt puller. The core/cladding composite was collected and found to have a 3.7 mm O.D. and a 3.3 mm I.D. The product was loaded into a convection oven and cured at 90° C. for a period of 44 hours. The white light (no diffuser) transmission loss for the resultant FLP was 2.67 dB/m, as determined by the cutback method.

EXAMPLE 10

A Core/Cladding Composite with High Residual Volatile Content in the Core Polymer The EA-based core polymer of Example 5 was metered to the coextrusion die. The core polymer temperature was 55° C. as it entered the coextrusion die at a rate of 37 g/min. The cladding polymer as described in Example 9 was conveyed to the die at a rate of 22 g/min. The outside diameter of the core mixture delivery tube exit was 7 mm and the inside diameter of the tube was 4.6 mm. The core polymer contained 9.6% residual monomer and numerous bubbles were observed at the point of contact with the cladding polymer. The occurrence of numerous bubbles illustrates the advisability of devolatilization; however, it is believed that higher boiling residuals or active cooling of the delivery tube, as illustrated in Example 19, will enable the process of this invention to produce useful light conduits from crosslinkable core mixtures containing up to 5 wt. %, perhaps more, of residual monomer. Further, formation of occasional small bubbles at the delivery tube, while undesirable from a process control and optimum property standpoint, were a common occurrence in many of the examples herein. Small amounts of such bubbles frequently disappeared upon curing, and did not typically prevent the fabrication of good quality light pipes (e.g. having losses <1 dB/m).

EXAMPLE 11

A Core/Cladding Composite with Low Residual Volatile Content in the Core Polymer The same core polymer described in Example 10 was devolatilized to a level of 0.01% residual monomer and metered to the coextrusion die at a rate of 46 g/min. and at a temperature of 111° C. The cladding polymer was conveyed to the die at rate of 26 g/min. The core mixture delivery tube dimensions are equivalent to those in Example 10. The bubbles observed in Example 10 were not present. However, large voids formed in the light pipe as the core polymer cooled to room temperature showing the effects of differential thermal contraction between the partially crystalline FEP resin and the rubbery core material.

Generally, it was observed that an excessively rapid cure or a cure conducted far below the filling temperature may trap in bubbles related to thermal contraction as seen in this Example. Thermal contraction of the crosslinkable core mixtures can be minimized using methods apparent to one skilled in the art such as control of cooling rate within the bath, maintaining a slight over-pressure on the crosslinkable core mixture at the filling point, or maintaining the core/cladding composite at an appropriate temperature (close to the core copolymer temperature during filling and the curing temperature). Most of the examples described herein were held at ambient temperature for a sufficient duration that bubbles formed. It was found, however, that bubbles which formed upon cooling usually were eliminated by the thermal expansion occurring in the early phase of a thermal cure cycle: core/cladding composites typically cured without any obvious deleterious residue of the thermal contraction bubbles, such as a corresponding optical scattering site.

EXAMPLE 12

A Closed Feed System to Reduce Particulates (Uncrosslinked Copolymer Devolatilized Directly in the Fabrication Feed Vessel)

An EA/MATS uncrosslinked copolymer synthesized according to Example 6 was heated to 110° C. in a 8 L stainless steel catch-pot, employed here as a feed vessel and pressurized to ca. 100 kPa with 0.2 micron filtered nitrogen. The copolymer flowed from the feed vessel through an electrically heated transfer line to a precision melt pump at a rate of 34 grams/min. A diaphragm pump was used to deliver a stream of dibutyltin diacetate (DBTDA) catalyst in a butyl acetate carrier at 0.27 grams/min. to a 6.35 cm i.d. (inner diameter), 160 ml. in-line mixer equipped with one 3.5 cm diameter four-blade turbine impeller. A syringe pump was used to deliver a stream of water at 0.13 g/min to the same mixer. The water, catalyst and uncrosslinked copolymer were mixed and transferred to a coextrusion die as described in Example 9. The FEP melt cone was drawn from the die as described in Example 9 and over the core mixture delivery tube. A core mixture delivery tube with a final diameter of 8 mm and an inside diameter of 4.6 mm, yielded a light pipe with a core diameter of 4.7 mm and an outer diameter of 5.5 mm.

The filled structure was thermally cured at 90° C. in a forced air oven. The cured product was then passed through a crosshead die where a LDPE sheathing was applied so that the total outside diameter was 8 mm. A light transmission loss of 1.13–1.85 dB/m was measured on the final sheathed product. A transmission loss for diffuse white light of 1.13–1.85 dB/m was measured in three cutbacks of the unsheathed FLP. A comparison of diffuse white light loss was also made for sheathed and unsheathed samples in which the core/cladding composite of each was fabricated within several minutes of one another. The comparison, shown in Table 2 for two samples (a) and (b), shows no significant effect of the sheathing process upon transmission loss.

EXAMPLE 13

Production of an EA/MATS Core FLP with a Narrow Air Gap Between the Exit of the Core Mixture Delivery Tube and the Quenching Water Level The EA/MATS uncrosslinked copolymer of Example 1 was mixed with the same reactive additives in a manner similar to Example 12 and conveyed to a coextrusion die. The core mixture delivery tube dimensions were equivalent to those of Example 9. The distance between the exit of the delivery tube and the water level was only 0.32 cm, demonstrating that a further drawdown after the delivery tube exit was not essential. The filled structure was thermally cured at 90° C. for a period of 7 days and subsequently sheathed with LDPE. Optical properties were measured on the material after only two days of aging. The cured core material was softer than usual, as a result of short cure times. The concentration of particulates was high as visualized by laser light scattering. As a result, losses were high: The transmission loss for diffuse white light was 1.98 dB/m for the resultant light pipe.

EXAMPLE 14

Production of a 5 mm Core Diameter (EA/MATS Core) FLP

The EA/MATS uncrosslinked copolymer of Example 1 was mixed as in Example 12. The dimensions of the core mixture delivery tube were adjusted so that the delivery tube exit outside diameter was 8.9 mm and the inside diameter was 4.5 mm. This adjustment was made in an effort to reduce the contact between the delivery tube and the FEP cladding so as to yield a smooth inner cladding surface. Details of Examples 14 a) and b) are provided in Table 1. The cured FLP of Example 14b was easier to kink during handling due to both lower catalyst concentration, which resulted in a noticeably softer core, and the thinner FEP wall.

Several pieces of the unsheathed product were measured for diffuse white light transmission efficiency: Losses for the FLP from run 14a produced light pipe ranging from 0.88 to 1.17 dB/m. Losses from run 14b were as low as 0.73 dB/m, although losses measured from material produced at the start of 14b were 2.13 dB/m, due to particulate contamination introduced at the start of the run.

Portions of the core/cladding structure were sheathed with LDPE to yield an outside diameter of 8 mm. A comparison of sheathed and unsheathed materials of Example 14, similar to that made in Example 12, again shows no significant effect of the sheathing process upon transmission loss. Data are provided in Table 2.

The resistance of the cured core material to thermal hardening was tested by using a Shore "A" meter. The average value obtained by axially compressing three 6-mm pieces of core material was recorded. A temperature of 120° C. was used for accelerated aging. Little or no increase was seen in the hardness after 165 hours, as compared to severe hardening within three hours for the reference FLP core material, taken from Lumenyte® EL200 optical pipe. Lumenyte EL200 is a sheathed 4.8-mm core diameter FLP believed to be based upon MMA copolymerized with diallyl carbonate monomers by a slow casting process. Data are presented in Table 3. The FLP fabricated by the process and chemistries described in this invention advantageously remain soft upon prolonged exposure to elevated temperature.

EXAMPLE 15

Production of a FLP at High Line Speed

The EA/MATS uncrosslinked copolymer of Example 1 was mixed as in Example 12. The core mixture delivery tube dimensions are the same as Example 14 except that the exit outside diameter was decreased to 8.5 min. The production speed was 3.4 m/min. Details of the run are provided in Table 1. Some of the product produced at this speed contained bubbles in the core structure after thermal curing, however useful optical properties were obtained from the remaining portion. The material was cured at 90° C. The transmission loss for diffuse white light was 1.12 dB/m for the resultant light pipe.

EXAMPLE 16

Production of a FLP Used in Color Tests

The EA/MATS uncrosslinked copolymer of Example 1 was mixed as in Example 12. The core mixture delivery tube had the following dimensions: the exit outside diameter was 7.94 mm and the inside diameter was 6.0 min. Details of the run are provided in Table 1. The transmission loss for diffuse white light for two samples of the resultant FLP were 1.02 and 1.11 dB/m, respectively.

Color of the FLP was measured using the cut-back interference filter technique described earlier. Results are provided in Table 4. The difference between the losses obtained using the 600 nm and 400 nm filters was 0.83 dB/m. The perceived color of transmitted white light is comparable to that of unaged Lumenyte EL200 for 2-3 meter lengths. Such low loss differentials are indicative of extremely low color. A loss of 1 dB/m is equivalent to an absorbence of 0.001 in a 1-cm path length, which is near the detection limit of many bench top UV-Vis instruments. Some fraction of observed loss differentials is likely due to the increased scattering efficiency of short wavelength light. Some perspective is gained by comparison to known polymer core light pipes. PMMA is known for its water-white optics. Published loss spectra for unaged high quality commercial PMMA optical fiber still show loss differential between 400 nm and 600 nm of approximately 0.2 dB/m. Published spectra for a commercial large-diameter silicone rubber optical fiber show loss differentials exceeding 8 dB/m between 480 nm and 600 nm, despite attaining losses under 1 dB/m at 650 nm.

EXAMPLE 17

Production of a Large Diameter (6.9 mm Core) FLP

An uncrosslinked copolymer was synthesized according to Example 2 and was mixed as in Example 12, except that the mixer of Example 12 was modified to include a second turbine impeller. The core mixture delivery tube was wrapped with a thin layer of tape (sold under the trademark Kapton ™, by DuPont) to provide additional insulation. The insulation was intended to compensate for the diminished air gap afforded by use of a larger diameter delivery tube. The conditions listed in Table 1 coupled with a delivery tube exit outside diameter of 9.5 mm and an inside diameter of 7.6 mm yielded a light pipe with a core diameter of 6.9 mm and a cladding wall thickness of 0.35 mm. Slight unidentified contamination led to an increase in transmitted color, as judged by looking through an uncured 3 meter core/clad composite. Mixing was poor at 90 g/min core polymer flow, despite the added impeller. Consequently, the cure rate was radially inhomogeneous within the FLP. The light pipe was fully cured after 25 days at 90° C. The transmission loss for diffuse white light was 1.12 dB/m for the resultant FLP; color was measured as in Example 16. The difference between the losses obtained using the 600 nm and 400 nm filters was 1.52 dB/m, confirming the yellow tint noticed upon fabrication.

EXAMPLES 18

Improved Mixing in Production of a Large Diameter (6.9 mm Core) FLP

A flexible light pipe with a core diameter of 6.9 mm and a cladding wall thickness of 0.4 mm was fabricated based on the conditions of Example 17, except that two 5.7 cm diameter 6-blade impellers were employed instead of two 3.5 cm diameter four-blade impellers. Details of the run are provided in Table 1. The light pipe was cured at a temperature of 90° C. for a period of 7 days. The transmission loss for diffuse white light was 1.08 dB/m for the resultant FLP. This result demonstrates comparable optical properties to 5 mm FLP's described earlier, which have roughly half the cross-sectional area of the product of this example. Color of the resultant FLP was measured as in Ex. 16. Results are provided in Table 4. The difference between the losses obtained using the 600 nm and 400 nm filters was 0.93 dB/m.

EXAMPLE 19

Production of an FLP Using a Cooled Core Mixture Delivery Tube

A flexible light pipe with a core diameter of 5.1 mm and a cladding wall thickness of 0.25 mm was made at conditions similar to Example 18 with the exception of a reduced FEP delivery rate and increased line speed. Details of the run are provided in Table 1.

Bubble formation sometimes occurs at the point of coextrusion contact between the core polymer and the FEP. Although such bubble formation does not preclude the fabrication of low loss FLP's, bubble formation at this point in the process increases roughness of the inside surface, which is believed to cause a slight increase in transmission loss. Two factors influencing bubble formation are the volatile content, and the temperature of the core material. A jacketed core mixture delivery tube, cooled by a flow of ambient temperature air, was used to minimize the formation of bubbles at the point of coextrusion contact between the core polymer and the FEP. No bubble formation was observed at the contact point during the run. Also, a steady operating condition was reached much more quickly upon commencement of acrylic flow than in similar runs performed without tip cooling. The product was cured at 90° C. for 6 days. The transmission loss for diffuse white light was 0.93 dB/m for the resultant light pipe. Color of the resultant FLP was measured as in Example 16. Results are provided in Table 4. The difference between the losses obtained using the 600 nm and 400 nm filters was 0.94 dB/m.

EXAMPLE 20

Production of an FLP Using a 94/6 EA/MATS, Mw ca. 28k Uncrosslinked Copolymer

The core polymer was synthesized according to Example 8 and the light pipe fabrication conditions were similar to Example 12. Details of the run are provided in Table 1.

The lower molecular weight core material processed without difficulty and was cured for three days at 90° C. The core was somewhat softer than usual, as was typical of short cure times ($\leq 4$ days) for similar compositions The FLP was otherwise normal in appearance and handling. Light transmission was poor due to a slight haze induced by contamination in the core material, which could be visualized by passing a laser beam through the cured core. The transmission loss for diffuse white light was 2.24 dB/m for the resultant light pipe.

EXAMPLES 21 AND 22

Production of 5 mm Core FLP

These examples were employed in characterization tests. These examples are very similar to Example 12 with line speeds that varied from 2.2 to 3.7 m/min. Details of the runs are provided in Table 1.

The product of Example 21 was cured for five days and the product of Example 22 was cured for 11 days, both at 90° C. Two samples prepared by Example 21 had diffuse white light losses of 1.06 and 0.92 dB/m, respectively. The transmission loss of a third sample prepared by Ex. 21 was 0.57 dB/m, for diffuse 600 nm light. The diffuse 600 nm light loss for a sample prepared (unsheathed) by Example 22 was 0.65 dB/m.

Portions of the core/cladding structure of Example 22 were sheathed with LLDPE to yield a FLP structure with an outside diameter of 8 mm. and a diffuse 600 nm light loss of 0.86 dB/m. A comparison of sheathed and unsheathed materials, similar to that made in Example 12, again shows little if any effect of the sheathing process upon transmission loss. Data are provided in Table 2.

The resistance of the cured core material of Example 22 to thermal hardening was tested by using the method described in Example 14, except that the 1213 hours (approximately 50.5 days) of aging at 120° C. were conducted prior to cutting and testing. A piece of the same material, held aside at ambient temperature during the heat aging, was employed as a control. Only a slight increase in hardness was noted after 50.5 days of heat aging. The small test specimens of Example 22 appeared "water white" after heat aging. By comparison, the Lumenyte EL200 reference material was yellow when observed after just 148 hrs of aging (Table 3).

EXAMPLES 23 AND 24

Production of 5 mm Core FLP

These examples were employed in characterization tests. The copolymer of Example 1 was mixed with water and catalyst as described in Example 12. These examples used the core mixture delivery tube of Example 15, with line speeds that varied from 1.8 to 3.7 m/min. Details of the runs are provided in Table 1.

The products of both Examples 23 and 24 were cured at 90° C. A sample prepared by Example 23, had transmission loss for diffuse 600 nm light of 0.67 dB/m and for diffuse white light of 0.88 dB/m. Portions of the core/cladding structure were sheathed with LLDPE to yield a FLP structure with an outside diameter of 8 mm.

Color of the resultant FLPs was measured as in Example 16; results are provided in Table 4. The difference between the losses measured using the 600 nm and 400 nm interference filters was 0.88 dB/m for the sheathed FLP of Example 23 and 0.80 dB/m for the unsheathed FLP of Example 24.

Many applications, such as automotive and certain display applications, require extended service above room temperature. The advantageous properties of FLP's of this invention for applications over a broad temperature range were demonstrated by the resistance of their physical and optical performance to thermal degradation. The resistance of the core material of Example 23 to thermal hardening was tested as described in Example 14. As in Example 14, little or no increase was seen in the hardness after 165 hours at 120° C. Data are presented in Table 3.

The effect of thermal aging at 90° C. upon low-temperature flexibility was tested for the sheathed FLP of Example 24 (Table 6). Flexibility was determined in terms of core material fracture resistance of the core material bent to a defined bend radius at the test temperature. Lumenyte EL200 optical pipe, employed as a reference material, passed the testing at $-40°$ C. prior to aging, but rapidly embrittled upon exposure to 90° C. aging. The FLP of Example 24 advantageously retains its flexibility under the most severe conditions employed ($-40°$ C., 2.54 cm bend radius) after aging 207 hrs at 90° C. As judged by the resistance of the core material of Examples 14, 22 and 23 to thermal hardening, it is anticipated that flexibility of the FLP's of this invention will be retained for periods of time much longer than tested.

The effect of thermal aging at 90° C. upon the color of transmitted light was also tested using the non-destructive interference filter method described previously. Two sheathed sections of FLP fabricated by Example 24, each 1.5 m in length, were aged for 50 days at 90° C. in a forced-air oven and optically characterized relative to an unaged control of the same length. The changes in the differential loss for the shorter wavelengths relative to 600 nm are reported in Table 5. The samples appeared to be physically unchanged by the aging, and no significant change in spectral distribution was observed. As discussed earlier, changes for 550 nm transmission for moderate discoloration were not expected, and this filter was only included to verify the method.

To develop a relative comparison, the test was repeated with a 2.5 m section of the sheathed FLP of Example 24 (Sample 24-3) and a 2.5 m section of the commercial sheathed FLP, Lumenyte EL200, by measuring before and after aging (no separate control samples). After only 64 hrs of aging at 90° C., the Lumenyte FLP had yellowed significantly and the FLP of Example 24 (24-3) appeared unchanged. These conclusions are reflected in the increase in differential loss when employing the 400 nm filter vs. the 600 nm filter, as summarized in Table 5. It is noteworthy that the transmission of white (hot mirror only) light did not change significantly relative to the 600 nm monitor. This shows the relative insensitivity of white light (broad spectrum) measurements to visually significant color increases. Because yellowing (blue light absorption) is the most significant challenge for white light conduits, these results verify both the advantageous thermal stability of the light pipes of this invention and the importance of assessing blue light transmission for white light conduits.

EXAMPLE 25

Production of a Light Pipe Using a 98/2 EA/MATS Uncrosslinked Copolymer; Water Added Prior to Fabrication A potential variant of the process is to add one of the key cure components (water or tin catalysts) in the original synthesis as an alternative to adding both in the mixer downstream in the process. The crosslinking rates for alkoxysilane cures are slow in the absence of catalyst and extremely slow in the absence of water. In this example we tested the viability of the variant in which water is added to the original monomer mix.

The uncrosslinked copolymer synthesized according to Example 7 was transferred from two 5-L round bottom flasks into a 6.4-L stainless steel degassing vessel. The contents of the degassing vessel were heated to 100° C. and held under 20 mm Hg pressure for 5 hours. At the end of this period, the reactor pressure was increased to atmospheric with filtered nitrogen. The uncrosslinked copolymer was fed to a melt pump which metered the stream through a 10 micron in-line filter. The filtered uncrosslinked copolymer stream then passed through a motionless mixer as described in Example 9. A stream of dibutyltin diacetate in a butyl acetate carrier was added to the uncrosslinked copolymer stream at the mixer entrance. The crosslinkable core mixture then passed through a core mixture delivery tube with the following dimensions: exit outside diameter of 5.3 mm and an exit inside diameter of 4.6 mm.

The fabrication process proceeded without incident, although gels were noted on the melt filter at the conclusion of the run. This indicates possible long-term operability problems for this specific mode of operation. The final sample had high levels of particulate contamination, and its diffuse white light loss was 5.30 dB/m.

EXAMPLE 26

Production of a Reduced Viscosity 95 EA/5 MATS Uncrosslinked Copolymer

This polymerization was run according to the conditions of Example 2, except that the n-DDM level was 1.4%. The conversion of the reactor effluent was 92%. The Mw was not measured, but may be assumed to be intermediate to that of Examples 1 and 8.

EXAMPLE 27

Production of a FLP Without Stabilizing the Cladding Melt Cone with the Core Mixture Delivery Tube An uncrosslinked copolymer was synthesized according to Example 26, and was mixed with water and catalyst solution as in Example 18. A light pipe with a core diameter of 4.0 mm and a cladding wall thickness of 0.25 mm was made using the cooled core mixture delivery tube of Example 19. However, the delivery tube was retracted such that it did not contact the molten cladding polymer. A stable running condition was easily maintained. Details of the run are provided in Table 1.

The product of Example 27 was cured for six days at 90° C. The cured product had a diffuse white light loss of 0.80 dB/km, as determined by the cutback method.

The following Tables provide summary data referred to in the detailed description of the Examples.

The core mixture delivery tube types used in Table 1 are described below:

| Tube Type | Description |
|---|---|
| #1 | 5.3 mm Outside Diameter/Straight<br>4.6 mm Inside Diameter |
| #2 | 5.3 mm Outside Diameter/Straight<br>3.8 mm Inside Diameter |
| #3 | 8.9 mm Outside Diameter/Flared<br>4.5 mm Inside Diameter |
| #4 | 8.45 mm Outside Diameter/Flared<br>4.5 mm Inside Diameter |
| #5 | 7.94 mm Outside Diameter/Straight<br>6.0 mm Inside Diameter |
| #6 | 9.53 mm Outside Diameter/Straight-wrapped with Kapton tape for additional insulation<br>7.6 mm Inside Diameter |
| #7 | Jacketed Air-Cooled Tube<br>8.5 mm Outside Diameter/Flared Tube<br>5.45 mm Inside Diameter<br>Cooling Jacket Outside Diameter is 12.7 mm, with a wall thickness of 0.5 mm |
| #8 | 7.0 mm Outside Diameter/Flared<br>4.6 mm Inside Diameter |
| #9 | 8.0 mm Outside Diameter/Flared<br>4.6 mm Inside Diameter |

Notes For Table 1:
Examples 9–25 and 27 are described trader their respective numbers in the specification.
ID—internal diameter
OD—outside diameter
wt. % and ppm are based on the crosslinkable core mixture weight.

TABLE 1

Summary of Examples 9–25 and 27

| Ex. | Synthesis Ex. # | Uncross-linked Copolymer Rate (g./min.) | Water Concen. (wt. %) | Carrier Concen. (wt. %) | Sn Catalyst (ppm) | Cross-linkable Core Mixture Temp (°C.) | Cladding Rate (g./min.) | Cross-linkable Core Mixture Delivery Tube Type | Production Rate (m/min) | Cladding ID/OD (mm) |
|---|---|---|---|---|---|---|---|---|---|---|
| 9 | 3 | 35 | 0.12 | 3.2 | 64 | 65 | 20 | 2 | 3.7 | 3.3/3.7 |
| 10 | 5 | 37 | none | none | none | 55 | 22 | 8 | 1.8 | 4.8/5.5 |
| 11 | 5 | 46 | none | none | none | 111 | 26 | 8 | 1.8 | 5.3/6.1 |
| 12 | 6 | 34 | 0.38 | 0.78 | 82 | 69 | 21 | 9 | 1.8 | 4.7/5.5 |
| 13 | 1 | 42–45 | 0.25 | 0.67 | 28–26 | 85 | 20-21 | 2 | 2.0 | 4.8–5.0/<br>5.4–5.6 |
| 14a | 1 | 40 | 0.29 | 0.48 | 40 | 79 | 19 | 3 | 1.8 | 5.0/5.6 |

TABLE 1-continued
Summary of Examples 9-25 and 27

| Ex. | Synthesis Ex. # | Uncross-linked Copolymer Rate (g./min.) | Water Concen. (wt. %) | Carrier Concen. (wt. %) | Sn Catalyst (ppm) | Cross-linkable Core Mixture Temp (°C.) | Cladding Rate (g./min.) | Cross-linkable Core Mixture Delivery Tube Type | Production Rate (m/min) | Cladding ID/OD (mm) |
|---|---|---|---|---|---|---|---|---|---|---|
| b  |   | 54 | 0.22 | 0.36 | 30 | 85 | 19 |   | 2.4 | 5.1/5.5 |
| 15 | 1 | 70 | 0.33 | 0.41 | 43 | 87 | 37 | 4 | 3.4 | 4.9/5.5 |
| 16 | 1 | 56 | 0.20 | 0.36 | 30 | 99 | 24 | 5 | 2.9 | 5.0/5.5 |
| 17 | 2 | 90 | 0.20 | 0.33 | 55 | 83 | 39 | 6 | 2.1 | 6.9/7.6 |
| 18 | 2 | 93 | 0.27 | 0.32 | 53 | 110 | 42 | 6 | 2.2 | 6.9/7.7 |
| 19 | 2 | 90 | 0.20 | 0.32 | 54 | 101 | 32 | 7 | 3.9 | 5.1/5.6 |
| 20 | 8 | 45 | 0.39 | 0.78 | 82 | 53 | 22 | 2 | 2.1 | 4.9/5.5 |
| 21 | 1 | 51 | 0.23 | 0.29 | 31 | 96 | 24 | 3 | 2.3 | 5.0/5.5 |
| 22 | 1 | 70 | 0.18 | 0.30 | 25 | 90 | 22 | 3 | 2.9 | 5.3/5.7 |
| 23 | 1 | 63 | 0.19 | 0.25 | 21 | 90 | 22 | 4 | 2.9 | 5.0/5.4 |
| 24 | 1 | 41–49 | 0.28–0.23 | 0.45–0.38 | 38–32 | 92 | 17–18 | 4 | 2.0 | 5.0/5.5 |
| 25 | 7 | 31 | 0.15 (from synthesis) | 0.82 | 62 | 146 | 26 | 1 | 1.2 | 4.8/5.8 |
| 27 | 26 | 81 | 0.33 | 0.35 | 59 | 80 | 46 | 7 | 5.9 | 4.0/4.5 |

TABLE 2
Effect of Sheathing Upon Optical Loss in Examples 12, 14 and 22

| Example | Unsheathed Cutback Loss (dB/m) | Sheathed Cutback Loss (dB/m) | Diffuse Excitation |
|---|---|---|---|
| 12a | 1.13 | 1.38 | White |
| 12b | 1.85 | 1.60 | White |
| 14a | 0.90 | 0.81 | White |
| 14b | 0.73 | 0.94 | White |
| 22 | 0.65 | 0.86 | 600 nm |

TABLE 3
Effect of Thermal Aging Upon Hardness

| Example # | Aging Time (Hr @ 120° C.) | Shore "A" Hardness |
|---|---|---|
| 14 | 0 | 50 |
| " | 12 | 50 |
| " | 165 | 52 |
| 22 (Control) | 0 | 53 |
| 22 (Aged) | 1213 | 59 |
| 23 | 0 | 50 |
| " | 12 | 49 |
| " | 165 | 52 |
| Lumenyte EL200 | 0 | 60 |
| (light pipe) |  |  |
| " | 1 | 69 |
| " | 3 | >90 |
| " | 148 | >90 |

TABLE 4
Wavelength Dependent Loss in Selected Light Pipes

| FLP Ex. # | Blue Light 400 nm | Green Light 550 nm | Orange Light 600 nm | Differential Loss 400 vs. 600 nm | Approx. Cutback Length (m) |
|---|---|---|---|---|---|
| 16 | 1.72 | 0.98 | 0.89 | 0.83 | 1.5 |
| 17 | 2.52 | 1.10 | 1.00 | 1.52 | 1.5 |
| 18 | 1.86 | 0.97 | 0.93 | 0.93 | 4.9 |
| 19 | 1.61 | 0.70 | 0.67 | 0.94 | 3.3 |
| 23 | 2.02 | 1.21 | 1.14 | 0.88 | 1.5 |
| 24 | 1.57 | 0.83 | 0.77 | 0.80 | 1.5 |

*Estimated by the two-point cutback interference filter method.

TABLE 5
Effect of Heat Aging Upon Wavelength Dependent Loss of Selected Examples

| Example/ Sample # | Aging Time (90° C.) | Change in Differential Loss 400–600 nm* (dB/m) | Change in Diffential Loss 550–600 nm* (dB/m) | Change Diffential Loss white–600 nm* (dB/m) |
|---|---|---|---|---|
| 24-1 | 50 days | 0.15 | −0.02 | n.m. |
| 24-2 | 50 days | 0.29 | 0.02 | n.m. |
| Avg. |  | 0.22 | 0.00 |  |
| 24-1 | 81 days | 0.54 | 0.03 | n.m. |
| 24-2 | 81 days | 0.56 | 0.05 | n.m. |
| Avg. |  | 0.55 | 0.04 |  |
| 24-3 | 64 hours | 0.10 | −0.05 | −0.01 |
| Lumenyte EL200 (light pipe) | 64 hours | 2.90 | −0.03 | −0.03 |

*Estimated by the non-destructive interference filter method. Changes are versus an unaged control for samples 24-1 and 24-2. Changes are versus measurements made prior to aging for sample 24-3 and the Lumenyte sample. Note: n.m. - not measured.

TABLE 6

Effect of Heat Aging Upon Low Temperature Flexibility

| Sheathed FLP | Aging Time at 90° C. (hr) | 2.5 cm Bend Radius (−40° C.) | 6.4 cm Bend Radius (−40° C.) | 2.5 cm Bend Radius (−20° C.) | 6.4 cm Bend Radius (−20° C.) | 2.5 cm Bend Radius (0° C.) | 6.4 cm Bend Radius (0° C.) |
|---|---|---|---|---|---|---|---|
| Ex. 24 | 0 | n.m. | n.m. | n.m. | n.m. | n.m. | n.m. |
| " | 64 | pass | pass | pass | pass | n.m. | n.m. |
| " | 207 | pass | pass | pass | pass | pass | pass |
| Lumenyte EL2000 | 0 | pass | pass | n.m. | n.m. | n.m. | n.m. |
| " | 64 | Fail | Fail | pass | pass | n.m. | n.m. |
| " | 207 | n.m | n.m. | Fail | Fail | Fail | Fail | n.m. - not measured
pass - no fracture of cured core
Fail - fracture of cured core Other embodiments of the invention will be apparent to those skilled in the art from a consideration of this specification or practice of the invention disclosed herein. It is intended that the specification and examples be considered exemplary only, with the true scope and spirit of tile invention indicated by the claims, following.

We claim:

1. A process for producing a cured composite comprising the steps of:
   a) concurrently and coaxially extruding:
      i.) a molten cladding polymer through an annular channel of a coextrusion die to form an extruded tubular cladding, and
      ii.) a synthesized crosslinkable core mixture comprising from about 72 to about 99.8 weight percent $C_1$–$C_{18}$ alkyl acrylates, through a core mixture delivery tube of the coextrusion die to form an extruded crosslinkable core mixture within the circumference of the extruded tubular cladding;
   b) filling and contacting the extruded tubular cladding with the extruded crosslinkable core mixture after exiting the coextrusion die; and
   c) curing the crosslinkable core mixture within the tubular cladding after filling and contacting the extruded tubular cladding with the extruded crosslinkable core mixture.

2. The process of claim 1 wherein steps a), b) and c) are continuous.

3. A process for producing light pipe comprising the steps of:
   a) concurrently and coaxially extruding:
      i.) a molten fluoropolymer through an annular channel of a coextrusion die to form an extruded tubular fluoropolymer cladding, and
      ii.) a synthesized crosslinkable core mixture comprising from about 72 to about 99.8 weight percent $C_1$–$C_{18}$ alkyl acrylates, through a core mixture delivery tube of the coextrusion die to form an extruded crosslinkable core mixture within the circumference of the extruded tubular fluoropolymer cladding;
   b) filling and contacting of the extruded tubular fluoropolymer cladding with the extruded crosslinkable core mixture after exiting the coextrusion die; and
   c) curing the extruded crosslinkable core mixture within the extruded tubular fluoropolymer cladding wherein the cured extruded crosslinkable core mixture and the extruded tubular fluoropolymer cladding are in substantially complete contact after filling the extruded tubular cladding with the extruded crosslinkable core mixture.

4. The process of claim 3 wherein steps a), b) and c) are continuous.

5. The process of claim 4 wherein the crosslinkable core mixture comprises:
   a) from about 90 to about 99.9 weight percent, based on the crosslinkable core mixture weight, of an uncrosslinked copolymer having weight average molecular weight from about 2,000 to about 250,000 daltons, the uncrosslinked copolymer comprising:
      i) from about 80 to about 99.9 weight percent based on the uncrosslinked copolymer weight, of $C_1$–$C_{18}$ alkyl acrylates selected from methyl acrylate, ethyl acrylate, normal butyl acrylate, 2-ethylhexyl acrylate or mixtures thereof,
      ii) front about 0.1 to about 20 weight percent, based on the uncrosslinked copolymer weight, of a functionally reactive monomer, and
      iii) from 0 to about 10 weight percent, based on the uncrosslinked copolymer weight, of a refractive index increasing monomer selected from styrene, benzyl acrylate, benzyl methacrylate, phenylethyl acrylate or phenylethyl methacrylate; and
   b) from about 0.1 to about 10 weight percent, based on the crosslinkable core mixture weight, of a reactive additive.

6. The process of claim 5 wherein
   a) the uncrosslinked copolymer molecular weight is from about 10,000 to about 150,000 daltons;
   b) the functionally reactive monomer is selected from hydroxyethyl acrylate, hydroxyethyl methacrylate, 2-hydroxypropyl acrylate, 2-hydroxypropyl methacrylate, or mixtures of these; and
   c) the reactive additive is selected from a diglycidyl ether, a dilactone, an aliphatic diisocyanate, a polycarboxylic acid, or an anhydride.

7. The process of claim 5 wherein
   a) the uncrosslinked copolymer molecular weight is from about 10,000 to about 150,000 daltons;
   b) the functionally reactive monomer is glycidyl acrylate or glycidyl methacrylate; and
   c) the reactive additive is selected from an anhydride, a polycarboxylic acid, a diol or a polyol.

8. The process of claim 5 wherein
   a) the uncrosslinked copolymer molecular weight is from about 10,000 to about 150,000 daltons;
   b) the functionally reactive monomer is used at a level of from about 0.5 to about 12 weight percent and is selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these; and c) the reactive additive is water and a silane condensation reaction catalyst.

9. The process of claim 8 wherein a) the bulk monomer unit is methyl acrylate, ethyl acrylate, or normal butyl acrylate, or mixtures of these;

b) the functionally reactive monomer is 3-methacryloxypropyltrimethoxysilane or vinyltrimethoxysilane; and c) the silane condensation reaction catalyst is a dialkyltin dicarboxylate.

10. The process of claim 9 further wherein the uncrosslinked copolymer is derived from about 94 to about 98 weight percent ethyl acrylate and from about 2 to about 6 weight percent of 3-methacryloxypropyltrimethoxysilane, and the silane condensation reaction catalyst is dibutyltin diacetate.

11. The process of claim 1 further comprising the step of sheathing the extruded tubular cladding with a sheathing polymer simultaneously with, or subsequently to, filling the extruded tubular cladding with the extruded crosslinkable core mixture.

12. The process of claim 3 further comprising the step of sheathing the extruded tubular fluoropolymer cladding with a sheathing polymer simultaneously with, or subsequently to, filling the extruded tubular fluoropolymer cladding with the extruded crosslinkable core mixture.

13. The process of claim 3 wherein an exit outside diameter of the core mixture delivery tube is from about 1 to about 4 times a diameter of the cured core.

14. The process of claim 3 wherein an inside diameter of the core mixture delivery robe is from about 0.75 to about 3 times a diameter of the cured core.

15. The process of claim 3 wherein the coextrusion die has an annular channel exit gap width of from about 1 to about 20 times a thickness of the extruded tubular fluoropolymer cladding.

16. The process of claim 3 having a distance between a cooling bath surface and an exit of the core mixture delivery tube of less than 20 times a diameter of the cured core.

17. The process of claim 3 having a distance between an outer die block and a cooling bath surface of from about 1 to about 20 times a diameter of the cured core.

18. The process of claim 3 wherein the coextrusion die has an annular channel diameter of from about 1 to about 15 times a diameter of the cured core.

19. A flexible light pipe product by the process of claim 3.

20. A flexible light pipe product by the process of claim 3 having good light transmittance, wherein the diffuse white light transmission loss is less than or equal to 1.0 decibel per meter, and wherein the differential transmission loss between light wavelengths of 400 nm to 600 nm is equal to or less than 1.0 decibel per meter as measured by a "cut-back" interference filter method.

21. A flexible light pipe product by the process of claim 3 having good thermal stability, wherein a change in the differential transmission loss between light wavelengths of 400 nm to 600 nm is equal to or less than 0.5 decibel per meter after 50 days of exposure to a temperature of 90° C., as measured by a non-destructive interference filter method.

22. A flexible light pipe product by the process of claim 3 having good flexibility, wherein the product, at 20° C., survives without core fracture a 180° bend at a bend radius which is less than or equal to five times the diameter of the cured core.

23. A flexible light pipe product by the process of claim 3 wherein the product has good hardness properties, wherein the Shore "A" hardness is less than 90 after 50 days of exposure at 120° C.

24. A flexible light pipe product by the process of claim 3 wherein the product has good light transmittance wherein the differential transmission loss between light wavelengths of 400 nm to 600 nm is equal to or less than 1.0 decibel per meter as measured by a "cut-back" interference filter method; good thermal stability, wherein a change in the differential transmission loss between light wavelengths of 400 nm to 600 nm is equal to or less than 0.5 decibel per meter after 50 days of exposure to a temperature of 90° C., as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

* * * * *